(12) United States Patent
Schuurmans et al.

(10) Patent No.: US 9,033,526 B2
(45) Date of Patent: May 19, 2015

(54) POWER FOLD MECHANISM

(75) Inventors: Maarten Schuurmans, Kingswood (AU); Garry Fimeri, Morphett Vale (AU); Simon Belcher, South Plympton (AU); Daniel Flynn, Morphett Vale (AU)

(73) Assignee: SMR Patents S.a.r.l., Luxembourg (LU)

( * ) Notice: Subject to any disclaimer, the term of this patent is extended or adjusted under 35 U.S.C. 154(b) by 873 days.

(21) Appl. No.: 13/240,602

(22) Filed: Sep. 22, 2011

(65) Prior Publication Data
US 2012/0087026 A1 Apr. 12, 2012

(30) Foreign Application Priority Data
Oct. 8, 2010 (EP) ..................................... 10186940

(51) Int. Cl.
*B60R 1/074* (2006.01)
*B60R 1/076* (2006.01)
*G02B 7/182* (2006.01)

(52) U.S. Cl.
CPC ................ *B60R 1/074* (2013.01); *B60R 1/076* (2013.01)

(58) Field of Classification Search
CPC ............................... B60R 1/074; B60R 1/076
USPC ......................................... 359/841, 872, 877
See application file for complete search history.

(56) References Cited

U.S. PATENT DOCUMENTS

| 6,022,113 | A | 2/2000 | Stolpe et al. | |
|---|---|---|---|---|
| 6,130,514 | A * | 10/2000 | Oesterholt et al. | 318/438 |
| 6,132,050 | A | 10/2000 | Sakata et al. | |
| 6,322,221 | B1 * | 11/2001 | van de Loo | 359/841 |
| 6,390,630 | B1 * | 5/2002 | Ochs | 359/841 |
| 6,543,902 | B2 * | 4/2003 | Bohm | 359/841 |
| 7,008,067 | B2 * | 3/2006 | Hsu | 359/841 |
| 7,303,294 | B1 | 12/2007 | Ruse et al. | |
| 7,490,945 | B2 * | 2/2009 | Proctor | 359/841 |
| 7,543,949 | B2 * | 6/2009 | van den Brink et al. | 359/877 |
| 8,366,284 | B2 * | 2/2013 | Flynn et al. | 359/841 |

FOREIGN PATENT DOCUMENTS

EP 2159102 3/2010

OTHER PUBLICATIONS

European Search Report for application No. EP 10 18 6940 dated Mar. 16, 2011.

* cited by examiner

*Primary Examiner* — Ricky D Shafer
(74) *Attorney, Agent, or Firm* — Reising Ethington PC

(57) ABSTRACT

A powerfold mechanism for an external rear view mirror is disclosed. The mechanism comprises: a powerfold housing mountable between a mirror housing and a vehicle mountable mirror base; a clutch member urged into engagement with the mirror, the clutch member allowing the mirror housing to be manually moved with respect to the mirror base; an electric drive train between the powerfold housing and the clutch member; and a drive stop movably mounted to the powerfold housing and having a drive stop face engagable with a drive stop detent mounted to the mirror base.

17 Claims, 33 Drawing Sheets

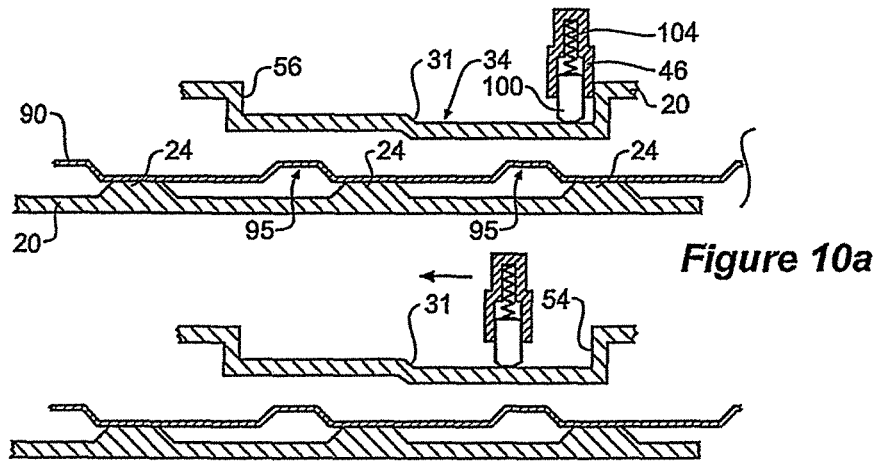
*Figure 10a*
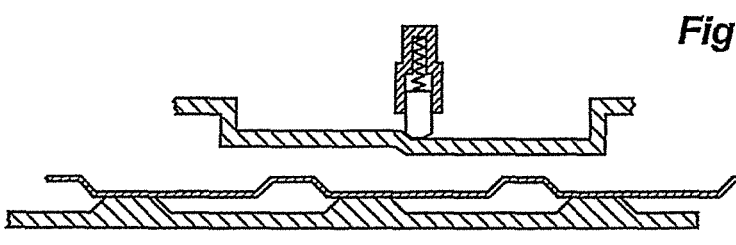
*Figure 10b*
*Figure 10c*
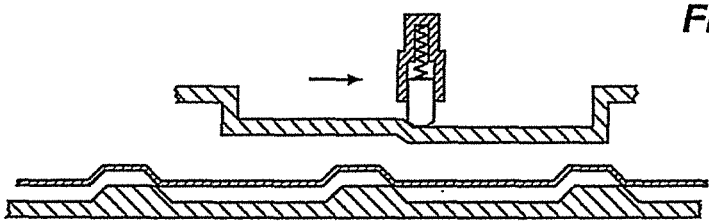
*Figure 10d*
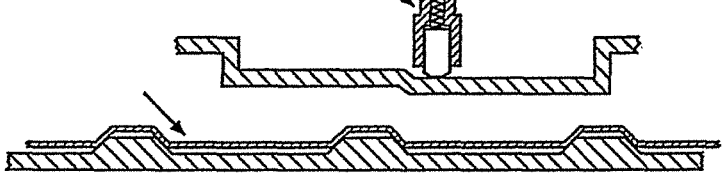
*Figure 10e*
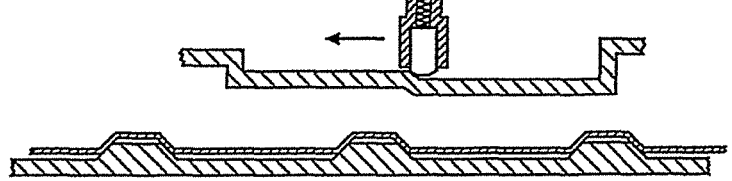
*Figure 10f*

POWER FOLD MECHANISM

The invention is based on a priority patent application EP 10186940.2 which is hereby incorporated by reference.

BACKGROUND ART

1. Field of the Invention

The present invention relates to powerfold mechanism for external rear vision mirrors of motor vehicles.

2. Description of the Related Art

Motor vehicles typically have two external rear vision mirror assemblies. The mirror assemblies typically have a mirror head that is designed to rotate about a substantially vertical pivot axis in both forward and rearward directions. The mirror head is typically held in its driving or deployed position by a detent which allows manual movement of the mirror head to a parked position and manual movement to a forward position. There are a number of reasons for this. One reason is safety. By having a mirror that can "break away" to move from a deployed position to a parked or forward position, injury to people can be avoided or at least minimised. Furthermore, damage to the mirror head can be avoided or at least minimised by allowing it to move when it hits obstructions. It is also useful to have a mirror head that can be parked, that is rotated to a position substantially parallel to the side of the vehicle, so as to narrow the effective width of the vehicle. This is particularly useful when the vehicle is parked. It is also useful for loading vehicles onto trucks for transport to be able to park the mirror heads.

Modern external rear vision mirrors, in addition to having a detent mechanism to hold the mirror head in a deployed position while at the same time enabling forward folding and rearward folding of the mirror head, also have electric drive systems to allow the operator to drive the head at least to its parked position. Some external rear view mirror assemblies have more sophisticated electric systems that allow the operator to redeploy the mirror head to a deployed position after it has been manually pushed forward or rearward. These mirror systems are typically referred to as powerfold mirrors.

Powerfold mirrors typically employ powerfold mechanisms that include springs to hold detents in place such that a predetermined force is required to manually break the mirror head out of the detent. A problem with many powerfold mechanisms is that, once they have been manually folded forward thereby breaking the mirror head out its detent, they cannot be reset at the deployed position electrically. Problems with other mechanisms include core vibration performance caused by lack of stability through the powerfold components.

U.S. Pat. No. 6,022,113 (Stolpe et al.) discloses a rear view mirror for a vehicle that can be pivoted both manually and electrically. A clutch between the mirror head and the base, in the form of latching cams on a base and recesses within a gear wheel, is described that allows the mirror head to be manually pivoted. Two drive stops are formed as an integral part of the housing. The drive stops are sloping faces on the housing that contact raised features on the base. The drive stops cannot be used to reset the clutch at the drive position after a manual fold. Instead the mirror head must be electrically driven against an end stop or fold path limiter so as to create the required reaction torque and rotation to reset the clutch.

It is an object of the present invention to provide an improved powerfold mechanism that overcomes at least some of the problems outlined above or at least offers a useful choice.

SUMMARY OF THE INVENTION

According to the invention there is provided a powerfold mechanism for an external rear view mirror to be fitted to a motor vehicle, the mechanism comprising:

a powerfold housing mountable between a mirror housing and a vehicle mountable mirror base;

a clutch member urged into engagement with the mirror base by a first spring means, the clutch member axially movable from an engaged position in which clutch detents positively restrain relative rotation between the clutch member and the mirror base and a disengaged position in which a frictional engagement torque only somewhat restrains relative rotation between the clutch member and the mirror base about a mirror head axis, the clutch member allowing the mirror housing to be manually moved with respect to the mirror base;

an electric drive train for creating relative rotation between the powerfold housing and the clutch member about the mirror head axis;

a drive stop movably mounted to the powerfold housing and having a drive stop face engagable with a drive stop detent mounted to the mirror base, the drive stop face biased axially towards the drive stop detent, the drive stop face arcuately movable with the powerfold housing between:

(a) a forward position wherein the powerfold housing and mirror head are in a forward fold position;

(b) a rearward position wherein the powerfold housing and mirror head are in a rearward fold position; and (c) a drive position wherein the powerfold housing and mirror head are in a deployed position, the clutch member is in the engaged position and the drive stop face is sandwiched between the drive stop detent and the powerfold housing so as to provide a positive and repeatable stop, wherein, when the clutch is in the disengaged position and the electric drive train creates relative rotation between the powerfold housing and the clutch member, the powerfold housing rotates relative to the base until the drive stop face reaches the drive stop detent and induces a reaction torque, the reaction torque being larger than the frictional engagement torque so as to stop the powerfold housing rotating with respect to the base and instead cause the clutch member to rotate until the clutch member reaches the engaged position.

In one form the drive train is non back-drivable.

In one form the drive train includes a worm gear.

In one form the worm gear meshes with a clutch gear, the clutch gear operably connected to or integral with the clutch member.

In one form, when the drive stop face reaches the drive stop detent while driven by the electric drive train, after the clutch member reaches the engaged position, the drive train is wound up rigidly rotationally fixing the powerfold housing with respect to the base against vibration loads.

In one form the drive stop includes a ring shaped drive stop body, the drive stop body axially movable with respect to the powerfold housing.

In one form the powerfold mechanism includes three drive stop faces and three corresponding drive stop detents.

In one form the drive stop face is located radially inwards with respect to the clutch detents.

In one form the powerfold mechanism includes a secondary spring, the secondary spring biasing the drive stop to move axially towards the drive stop detent.

In one form the drive stop is movably mounted to the powerfold housing such that friction prevents relative movement between the drive stop body and the powerfold housing when the drive stop face pushes against the drive stop detent.

In one form the drive stop body is mounted to the powerfold housing by a spline.

In one form the spline is arranged and constructed such that friction within the spline prevents relative movement between the drive stop body and the powerfold housing when the drive stop face pushes against the drive stop detent.

In one form the clutch member includes a lug projecting radially inwards for engagement with a button mounted to the drive stop.

In one form the button is movable radially from: an extended position in which relative axial movement between the drive stop body and the clutch is inhibited, to a retracted position where it is not.

In one form the button is pushed to the retracted position during relative rotational movement between the drive stop and the clutch when the button and the lug are at overlapping axial positions.

In one form the drive stop comprises a slidably mounted pin mounted to the powerfold housing and having a pin end extendable along the mirror head axis, the pin end biased towards the drive stop detent.

In one form the drive train includes as worm gear, the worm gear meshing with a clutch gear, the clutch gear operably connected to or integral with the clutch member.

In one form the pin is located adjacent to and outboard of the clutch gear but in a position substantially opposite the worm gear.

Specific embodiments of the invention will now be described in some further detail with reference to and as illustrated in the accompanying figures. These embodiments are illustrative, and are not meant to be restrictive of the scope of the invention.

BRIEF DESCRIPTION OF THE DRAWINGS

Preferred embodiments of the invention are illustrated in the accompanying representations in which:

FIG. 1b is a diagrammatic view of the cam and follower components of the mechanism shown in FIG. 1a;

FIGS. 10a, 10b, 10c and 10d are diagrammatic views of the assembly of FIG. 1a showing progressive movements during electric recovery from a manual fold into the deployed position;

DETAILED DESCRIPTION OF PREFERRED EMBODIMENTS OF THE INVENTION

The present invention relates to powerfold mechanism for external rear vision mirrors of motor vehicles.

First Embodiment

Figure 1A:
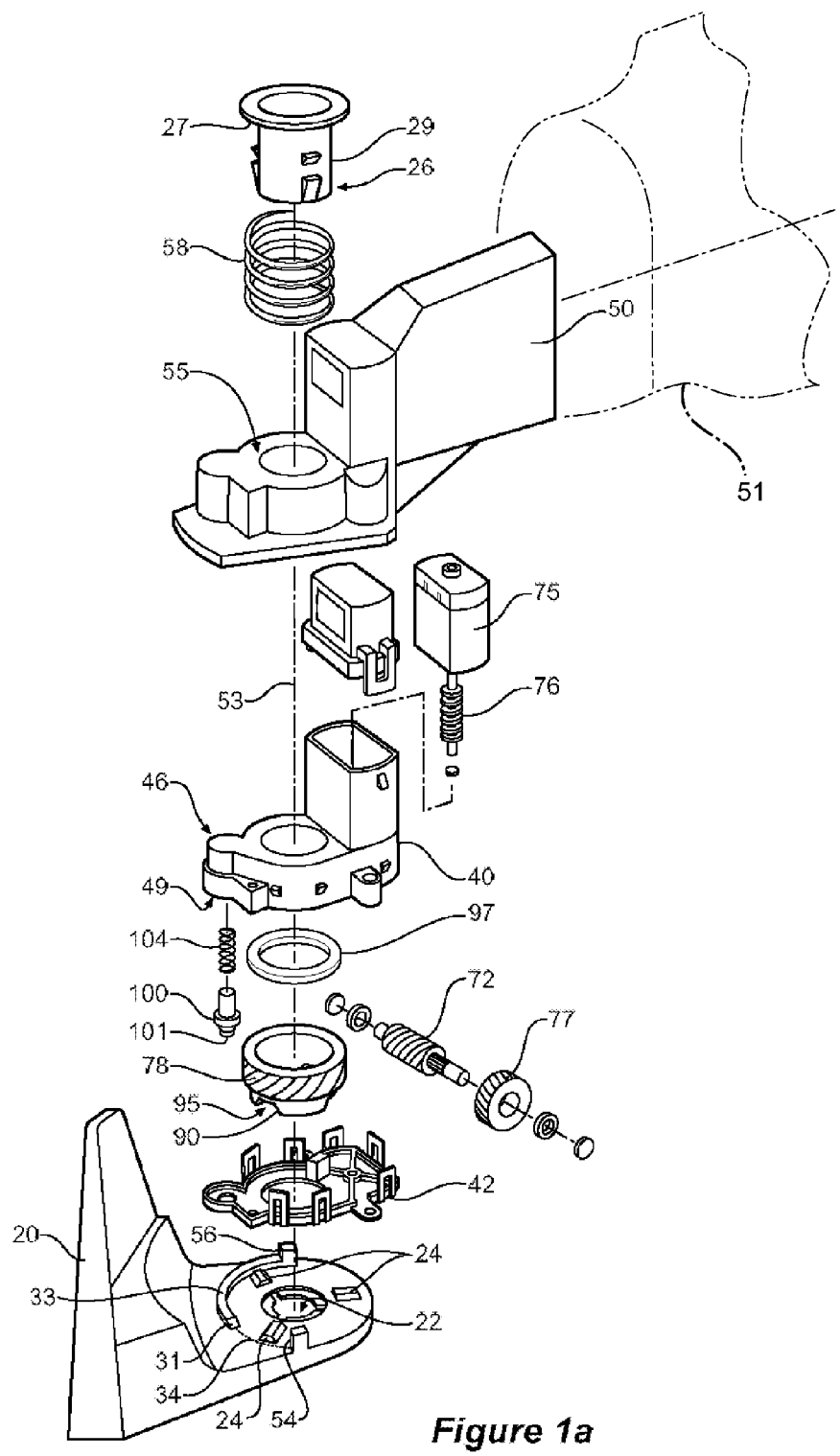
FIG. 1a is an exploded isometric view of a powerfold mechanism according to a first embodiment of the invention.
Figure 1B:
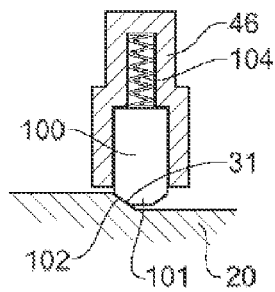
Figure 2A:
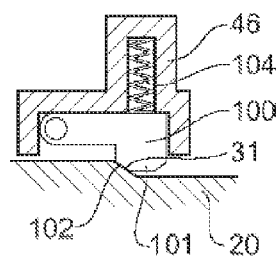
FIGS. 2a, 2b, 3a, 3b, 4a, 4b, 5a, 5b, 6a, 6b, and 6c are alternative cam follower mechanisms to that shown in FIGS. 1a and 1b.
Figure 2B:
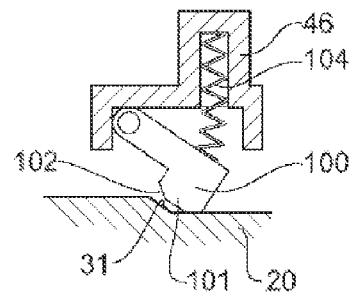
Figure 3A:
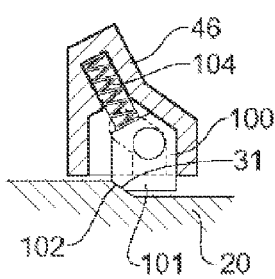
Figure 3B:
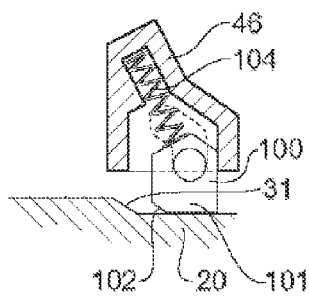
Figure 4A:
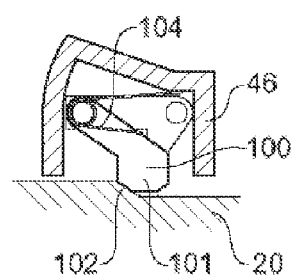
Figure 4B:
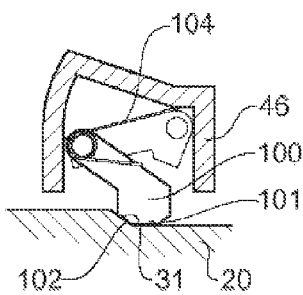
Figure 5A:
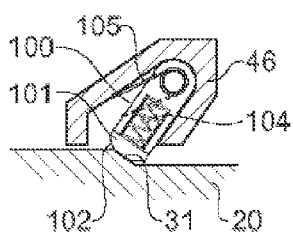
Figure 5B:
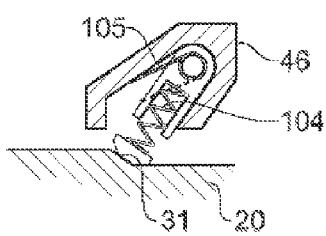
Figure 6A:
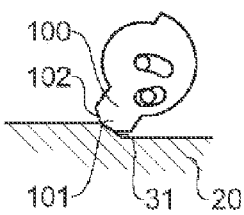
Figure 6B:
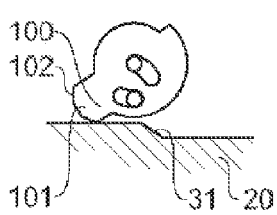
Figure 6C:
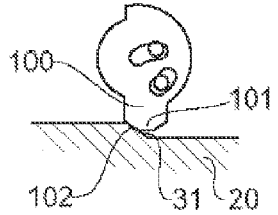

Referring to FIG. 1a, a powerfold mechanism for an external rear view mirror according to a first embodiment of the invention is shown. The mechanism includes a frame 50 mountable between a mirror housing (not shown) and a mirror base 20. The mirror base 20 is mountable to a vehicle (not shown). A clutch member 90 is urged into engagement with the mirror base 20 by first spring means. The first spring means is shown in the form of a spring 58 in FIG. 1a. The spring 58 is compressed between the underside of a flange 27 of spigot 29 and the spring seat 55 on the frame 50. On the other side of spring seat 55 is a thrust bearing 97 within a power fold housing 40 that transfers the force generated by spring 58 to the clutch member 90. The spigot 29 is attached to the mirror base 20 by a bayonet feature on a bayonet end 26 of the spigot 29 and the bayonet aperture 22 within the mirror base 20.

Figure 7A:
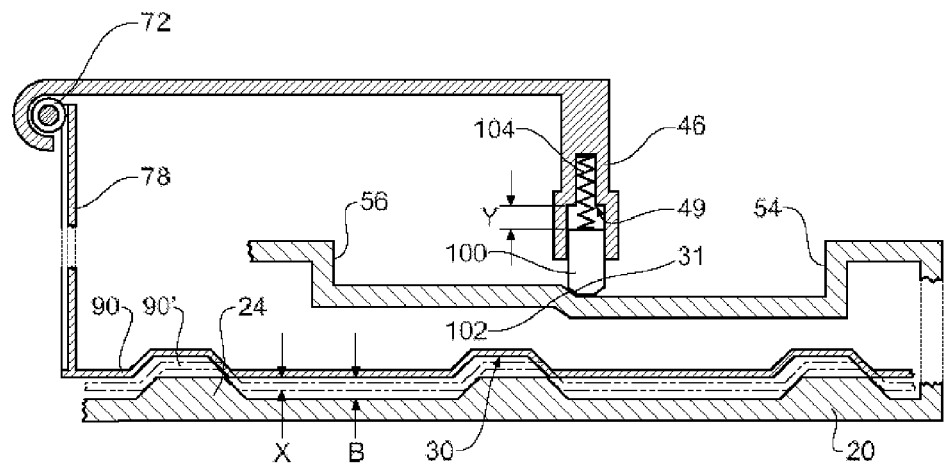
FIGS. 7a, 7b and 7c are diagrammatic views of the assembly of FIG. 1a Showing Interactions and Relative Movements of Various Components at or Near the deployed position.

The clutch member 90 is axially movable over a axial distance X (shown in FIG. 7*a*) from an engaged position in which clutch detents positively restrain relative rotation between the clutch member 90 and the mirror base 20 and a disengaged position in which a frictional engagement torque only somewhat restrains relative rotation between the clutch member 90 and the mirror base 20 about a mirror head axis. In the embodiment of the invention shown in FIG. 1*a*, the clutch detents are formed by clutch detent recesses 95 within the clutch member 90 and detent features 24 on the mirror base 20. FIG. 7*a* also shows schematically the interaction between the main worm gear 72, within the pin housing 46, and the clutch detents.

A non-back drivable electric drive train for creating relative rotation between the frame 50 and the clutch member 90 about the mirror head axis 53 is provided. The electric drive train includes a motor 75 that drives a motor worm 76 engaging a gear 77 that in turn drives a main worm gear 72. The main worm gear 72 meshes with drive gear 78 as is most clearly shown in FIG. 1*a*. In the embodiment shown, the drive gear 78 is formed directly onto the clutch member 90. In other embodiments of the invention, not shown, the drive gear 78 and the clutch member 90 may be separate components.

An arcuate track including a cam forms part of the base 20. Referring again to FIG. 1*a*, the arcuate track of the embodiment of the invention illustrated includes an upper arc 33, a detent 31 and a lower arc 34, the drive stop detent 31 forming the cam. With the embodiment of the invention shown, the upper and lower arcs and the detent 31 are moulded into a plastic component that forms the mirror base 20. In other embodiments of the invention, these components may be separate.

A track follower, in the form of a pin 100, is mounted to the frame 50 by virtue of being located within a pin housing 46 within a powerfold housing 40 that attaches to the frame 50. A compression spring 104 biases the pin 100 axially towards the drive stop detent 31 as is shown in FIG. 1*a*. In other embodiments (not shown) the pin may be biased axially by gravity.

Figure 7B:
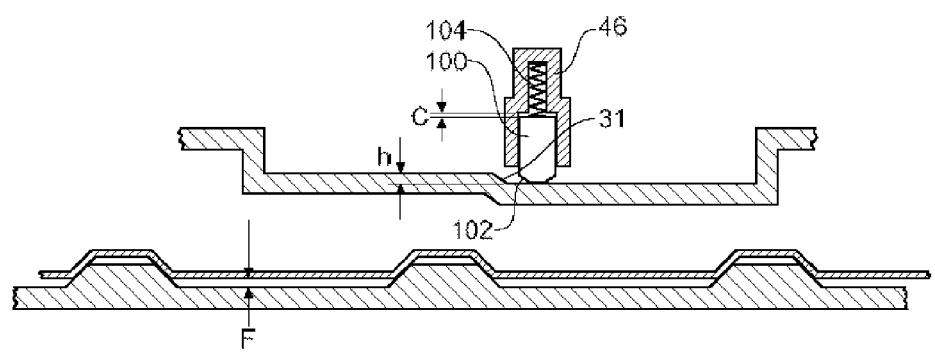
Figure 7C:
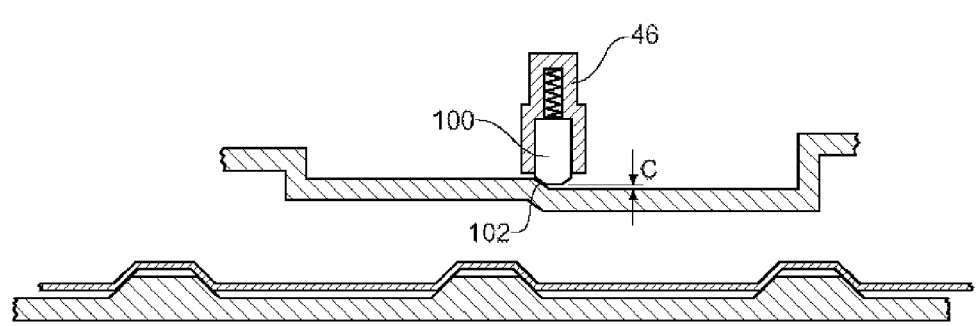
Figure 12A:
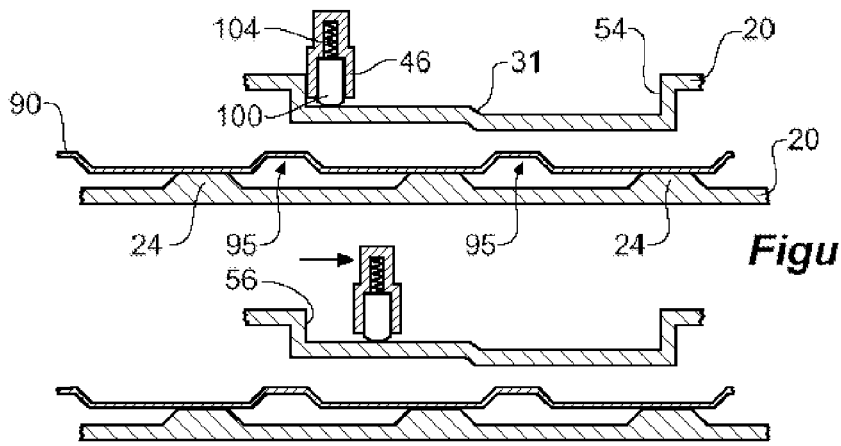
FIGS. 12a, 12b, 12c, 12d, 12e, 12f and 12g are diagrammatic views of the assembly of FIG. 1a showing progressive movements during electric recovery from a manual fold forward position to the deployed position.
Figure 12B:
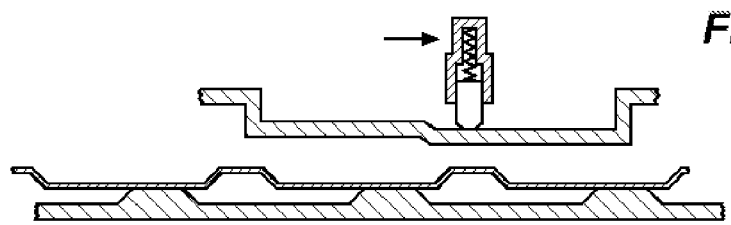

The follower in the form of pin 100 has an end 101 that is extendable an axial distance Y along the mirror head axis 53. The distance Y together with the distance X is shown in FIG. 7*a*. FIG. 7*a* shows the powerfold mechanism in a position during electric recovery or electric actuation from a manual fold in position towards the normal driving or deployed position. The pin 100 is the first embodiment of drive stop mean according the invention The pin 100 is accurately moveable with the frame 50 between:
  a forward position, diagrammatically illustrated in FIG. 12*a*, wherein the frame and mirror head are in a forward fold position;
  a rearward position, diagrammatically illustrated in FIG. 10*a*, wherein the frame 50 and mirror head 51 are in a rearward fold position; and
  a deployed or drive position, diagrammatically illustrated in FIGS. 7*c* and 8*a*, in which the frame 50 and the mirror head 51 are in a deployed position. In this position, the follower end is sandwiched between the drive stop detent 31 and the frame 50 (by virtue of the pin housing 46 and the powerfold housing 40 being clipped into the frame 50) so as to provide a positive and repeatable stop against which the non-back drivable drive train is wound up to thereby rigidly rotationally fix the mirror frame 50 with respect to the base 20. The pin 100 therefore functions as a drive stop.

Referring again to FIGS. 7*a*, 7*b* and 7*c*, it can be seen that the height of h of the detent 31 is less than the height of X of the clutch detents. The importance of this will become apparent as the operation of the mechanism is described below.

Operation of Powerfold Mechanism—First Embodiment

Figure 8A:
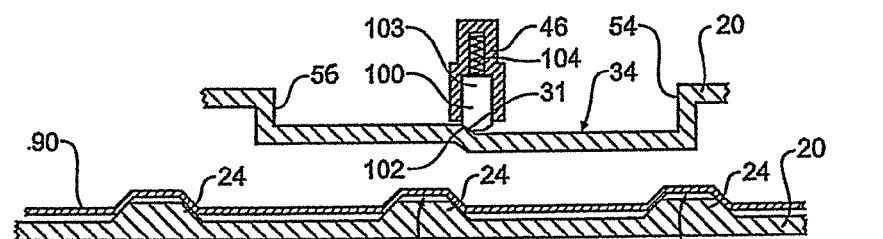
FIGS. 8a, 8b, 8c and 8d are diagrammatic views of the assembly of FIG. 1a showing progressive movements during electric fold in of the mirror frame from its deployed position to its parked position.
Figure 8B:
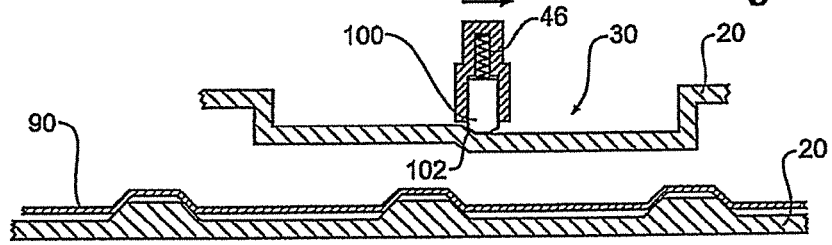
Figure 8C:
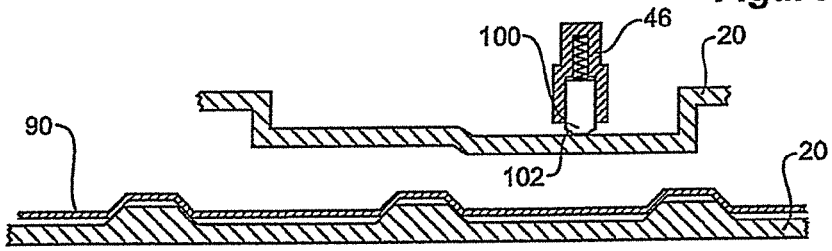
Figure 8D:
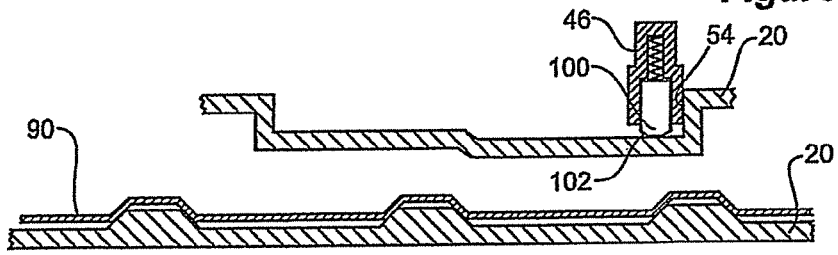

Referring now to FIGS. 8*a*, 8*b*, 8*c* and 8*d*, progressive movements during electric fold in of the mirror frame 50 (and hence mirror head) to the park position are illustrated diagrammatically. In FIG. 8*a* it can be seen that the clutch member 90 is engaged with the detent features 24 engaged with the clutch detent recesses 95. The end 101 of the pin 100 has a drive stop face 102 that is engaged against the detent 31. The upper end of the pin 103 is hard up against a bore 49 of the pin housing 46 (the bore 49 is more clearly visible in FIG. 7*a*.)

The operator actuates the switch within the cabin of the vehicle to commence the electric fold in process. This sends electrical power to the motor 75 which in turn results in the main worm gear 72 driving the drive gear 78 (which at this stage is locked to the mirror base by virtue of the clutch). The first movement is indicated by an arrow in FIG. 8*b*. In moving from FIG. 8*a* to FIG. 8*b* it can be seen that the pin 100 slides down the detent 31 slightly and then in FIG. 8*c* it can be seen that the pin slides along the lower arc 34 of the track until reaching a park end stop 54.

Figures 9A, 9B, 9C, 9D:
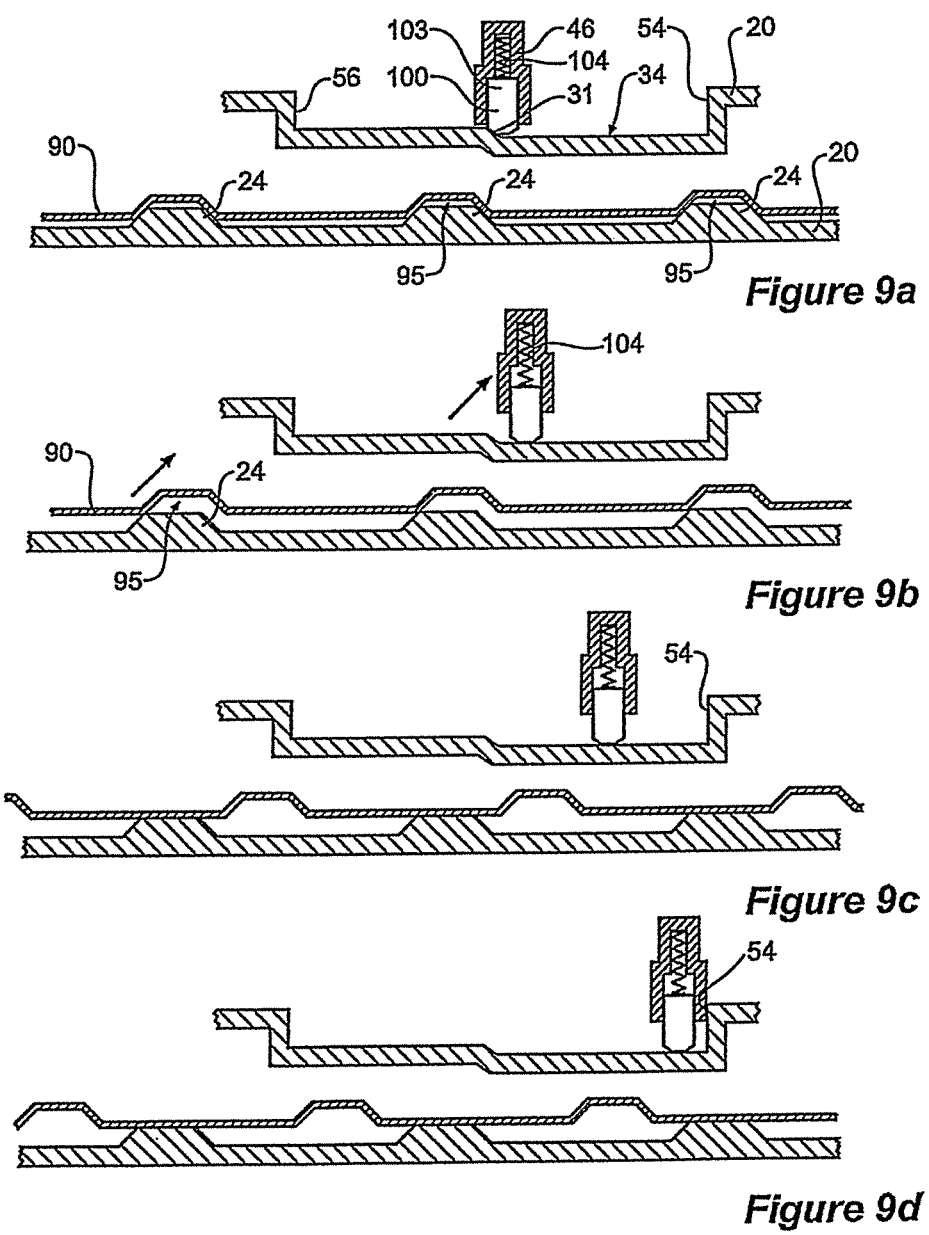
FIGS. 9a, 9b, 9c and 9d are diagrammatic views of the assembly of FIG. 1a showing progressive movements during manual fold in of the mirror frame from its deployed position to its parked position.

Referring now to FIGS. 9*a* to 9*d*, the process of manually folding the mirror head from its deployed position to its parked position along side the vehicle will be described. FIG. 9*a* shows the powerfold assembly in the drive or deployed position. As the mirror head and hence the frame 50 and pin housing 46 are rotated towards the vehicle, the non-back driveable gear train ensures that a breakaway torque is transmitted to the clutch. More specifically, ramped surfaces of the clutch detent recesses 95 slide up over the detent features 24 as is shown progressively from FIGS. 9*a* to 9*b*. As this occurs, the first spring 58 is compressed while the compression spring 104 extends from the position shown in FIG. 9*a* to the position shown in FIG. 9*b* as it pushes the pin 100 downwards so that it remains engaged with the lower arc 34 of the track on the base 20. The stroke of the compression spring 104 is the distance Y shown in FIG. 7*a*. The stroke, Y, is sufficient to keep the pin 100 engaged with the track while the clutch disengages as shown in FIG. 9*b*. Continuing rotation of the mirror head hence pin housing 46 is shown in FIGS. 9*b* to 9*d*. Once the position illustrated in FIG. 9*d* is reached, the pin housing 46 is restrained from further movement by the frame park stop 54.

If the vehicle driver, or any other person, wishes to restore the mirror head to the drive position from the park position illustrated in FIG. 9*d*, then that person can either manually rotate the mirror head back into position shown in FIG. 9*a* or alternatively they can actuate a switch (generally within the cabin of the vehicle) so as to electrically drive the mirror head from the park position to the drive position. This electric recovery process is illustrated in FIGS. 10*a* to 10*f*.

Turning to FIG. 10*a*, it can be seen that in this position, the clutch is disengaged. There is however, some frictional engagement between the clutch member 90 and the base 20. This frictional engagement is a function of both the force imparted by the first spring 58 and the coefficient of friction and general disposition of the interface surfaces between the base 20 and the clutch member 90. So, as the electric drive train rotates the main worm gear 72, thereby creating relative rotation between the frame 50 and the clutch 90, the frame rotates relative to the base until the pin 100 reaches the cam, in the form of the detent 31 as is illustrated progressively in FIGS. 10b and 10c. At this point, a reaction torque is induced, the reaction torque being larger than the frictional engagement torque so as to stop the frame 50 rotating with respect to the base 20 and instead cause the clutch member to rotate until the clutch member reaches the engaged position illustrated in FIG. 10e. With the frame moving downwards under the action of first spring 58, the frame also rotates backwards slightly as is indicated by the arrow on FIG. 10e. The frame then continues to rotate as it is driven by the drive train until the end 101 of the pin 100 moves up the ramp 34 to the drive position shown in FIG. 10f. At this point, the pin 100 is sandwiched between the detent 31 and the frame 50 (by virtue of the pin housing 46 engaging with the frame 50) so as to provide a positive and repeatable stop against which the non-back driveable drive train is wound up until the motor 75 stalls. This rigidly rotationally fixes the mirror frame 20 with respect of the base 20. In addition to providing an accurate and repeatable mirror head position, the sandwiching of the pin 100 provides a rigid structure for vibration performance of the mirror.

Figure 11A:
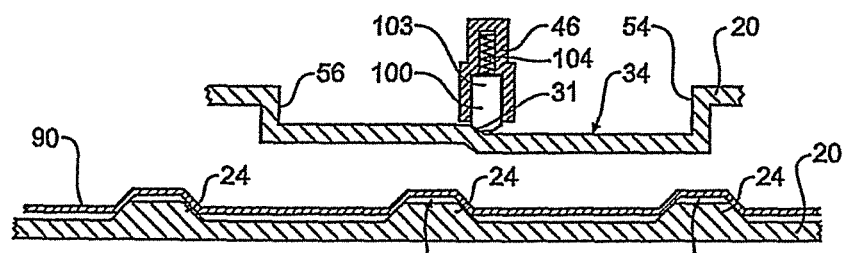
FIGS. 11a, 11b, 11c and 11d are diagrammatic views of the assembly of FIG. 1a showing progressive movements during manual fold forward of the mirror frame from its deployed position to the forward end stop.
Figure 11B:
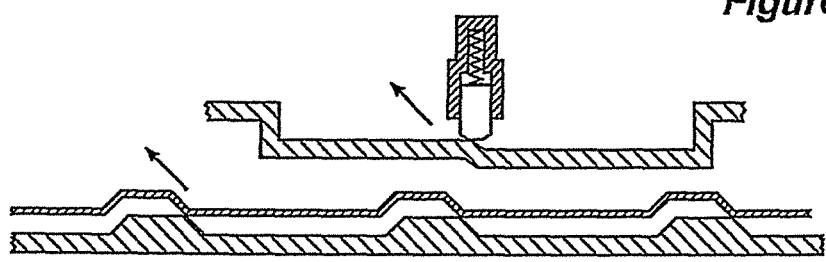
Figure 11C:
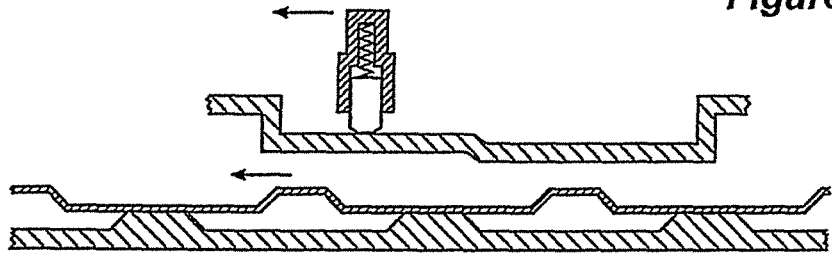
Figure 11D:
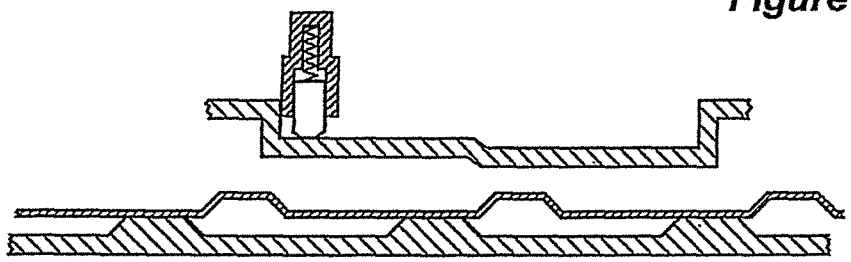

FIGS. 11a to 11d show progressive movements during manual fold forward of the mirror frame 50 from its drive position to the forward end stop 56. As the operator (or a foreign object) pushes the mirror head and hence the mirror frame 50 forwards, the non-back driveable gear train ensures that a breakaway torque is transmitted to the clutch. Specifically, ramped surfaces of the clutch detent recesses 95 slide up over the detent features 24 as is shown progressively from FIGS. 11a to 11b. As this occurs, the first spring 58 is compressed while the compression spring 104 extends slightly from the position shown in FIG. 11a to the position shown in 11b. The slight extension is due to the fact that the height of the detent 31 is less than the height X of the clutch detents (illustrated in FIGS. 7a and 7b). Continuing rotation of the mirror head and hence the pin housing 46 in a forward direction shown in FIGS. 11c to 11d. Once the position illustrated in FIG. 11d is reached, the pin housing 46 is restrained from further movement by the frame forward end stop 56.

As should be clear from the above, the pin 100 can only rise up over the detent 31 when the clutch disengages. When the clutch is engaged, the detent 31 provides a positive and repeatable end stop for the electric rotation of the pin 100 in the forward direction.

Figure 12C:
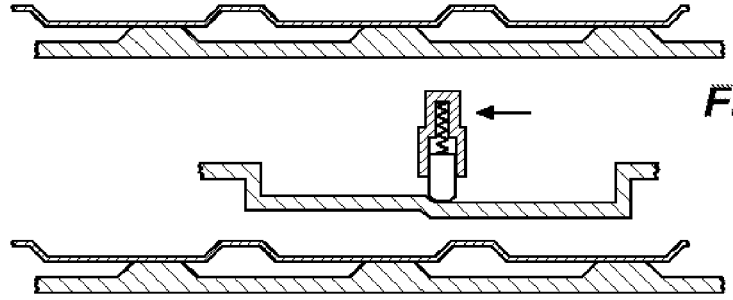
Figure 12D:
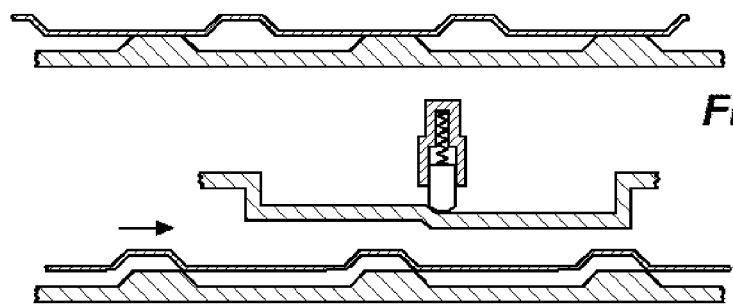
Figure 12E:
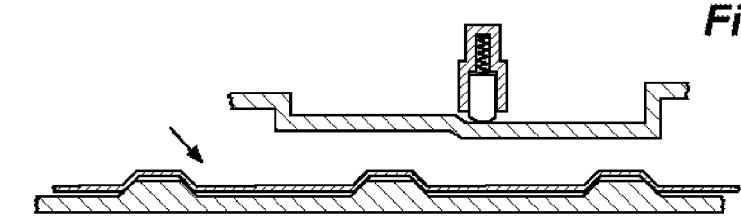
Figure 12F:
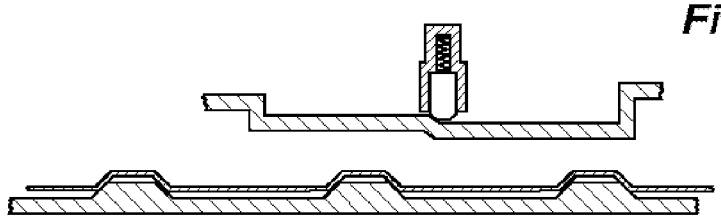
Figure 12G:

FIGS. 12a to 12g show progressive movements during electric recovery from the position shown in FIG. 11d, the manual forward fold position to the drive position. The operator of the vehicle actuates the switch within the cabin of the vehicle to commence electric fold back of the mirror head towards the drive position. This actuation sends electrical power to the motor 75 which in turn results in the main worm gear 72 driving around the drive gear 78. As described previously, the frictional engagement between the clutch and the base is sufficient to enable relative rotation between the frame 50 and the base 20 to occur. The frame 50 continues to rotate backwards until the position illustrated in FIG. 11c is reached. At this point the operator will generally observe that the head has rotated too far and will reverse the direction by actuating a switch. The mirror head will then rotate forward to the drive position as illustrated in FIGS. 12c to 12f. More specifically, once the pin 100 reaches the detent 31 as is shown in FIG. 12c a reaction torque will be generated that is larger than the frictional engagement torque which will stop the frame rotating with respect to the base and will cause the clutch member 90 to rotate until it reaches the engaged position shown in FIG. 12f. At that point, the frame rotates slightly again as the drive train drives up against the clutch detents until the follower end moves up the detent 31 to the drive position where the drive train is wound up into the position shown in FIG. 12g.

In the embodiments described above, the track follower is in the form of a pin 100. In other embodiments of the invention, alternative followers or drive stops 100b may be employed. Examples of alternative followers or drive stops are illustrated in FIGS. 2a, 2b, 3a, 3b, 4a, 4b, 5a, 5b, 6a, 6b, and 6c.

Second Embodiment

Figure 13:
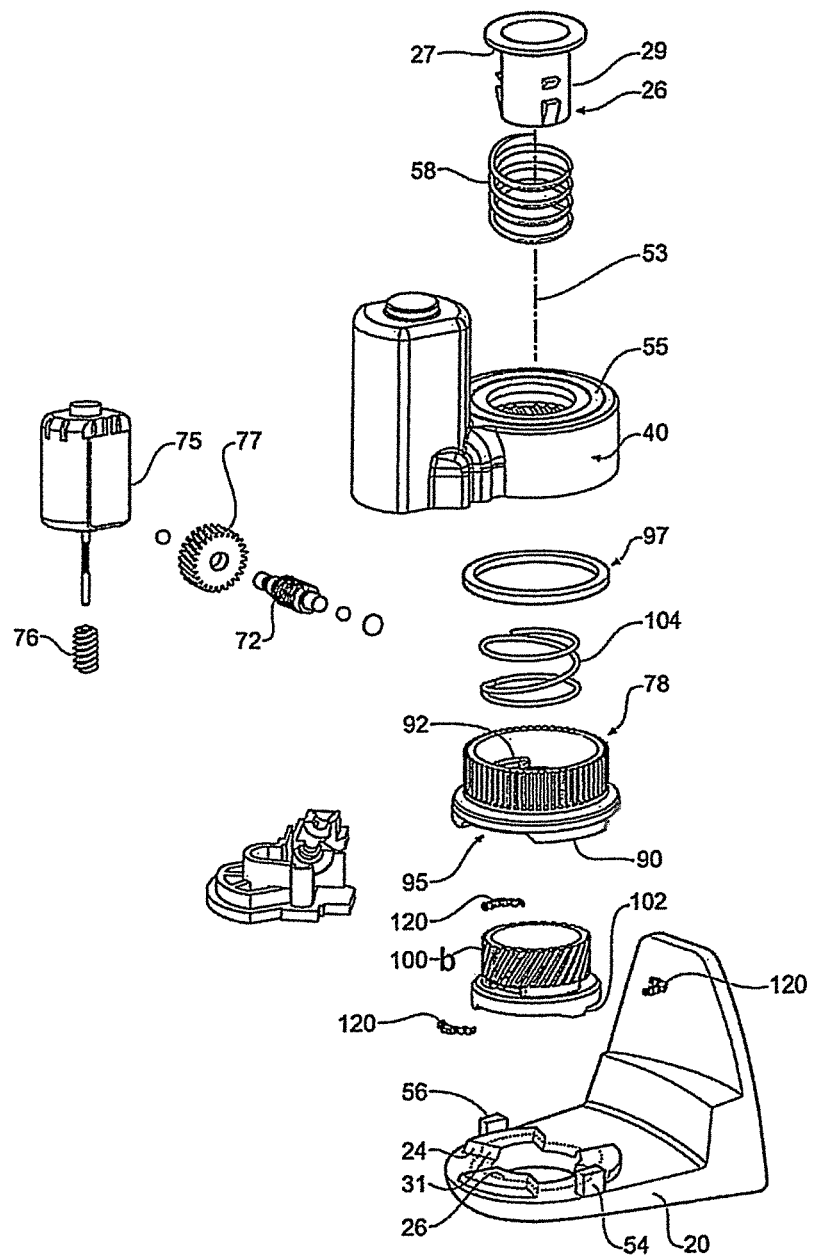
FIG. 13 is an exploded isometric view of a powerfold mechanism according a second embodiment of the invention.

Referring to FIG. 13, a powerfold mechanism for an external rear view mirror according to a second embodiment on the invention is shown. The mechanism includes powerfold housing 40 mountable between a mirror housing 51 and a mirror base 20. The mirror base 20 is mountable to a vehicle (not shown). A clutch member 90 is urged into engagement with the mirror base 20 by first spring means. The first spring means is shown in the form of a spring 58 in FIG. 13. The spring 58 is compressed between the underside of a flange 27 of spigot 29 and a spring seat 55 on the powerfold housing 40 (or on a spring seat 55 on an intermediate component such as a frame 50 as is shown in FIG. 1a). On the other side of spring seat 55 is a thrust bearing 97 that transfers the force generated by spring 58 to the clutch member 90. The spigot 29 is attached to the mirror head 51 by a bayonet feature on a bayonet end 26 of the spigot 29 and the bayonet aperture 22 within the mirror base 20.

Figure 15:
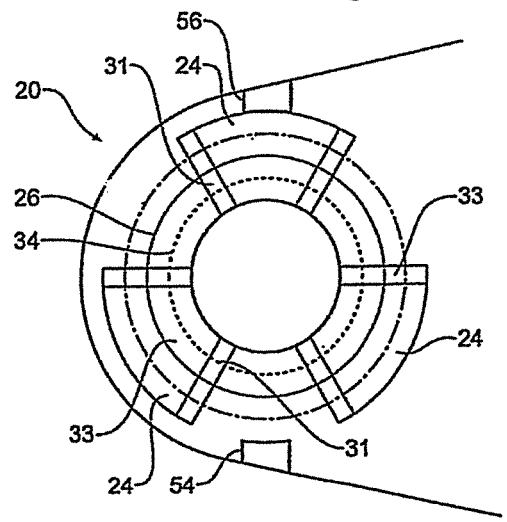
FIG. 15 is a plan view of a portion of the base showing the detent circle and the drive stop circle.

The clutch member 90 is axially movable from an engaged position in which clutch detents positively restrain relative rotation between the clutch member 90 and the mirror base 20 and a disengaged position in which a frictional engagement torque only somewhat restrains relative rotation between the clutch member 90 and the mirror base 20 about a mirror head axis. In the embodiment of the invention shown in FIGS. 13 and 15, the clutch detents are formed by clutch detent recesses 95 within the clutch member 90 and detent features 24 on the mirror base 20.

A non-back drivable electric drive train for creating relative rotation between the frame 50 and the clutch member 90 about the mirror head axis 53 is provided. The electric drive train includes a motor 75 that drives a motor worm 76 engaging a gear 77 that in turn drives a main worm gear 72. The main worm gear 72 meshes with drive gear 78 as is most clearly shown in FIG. 1a. In the embodiment shown, the drive gear 78 is formed directly onto the clutch member 90. In other embodiments of the invention, not shown, the drive gear 78 and the clutch member 90 may be separate components.

Figure 14:
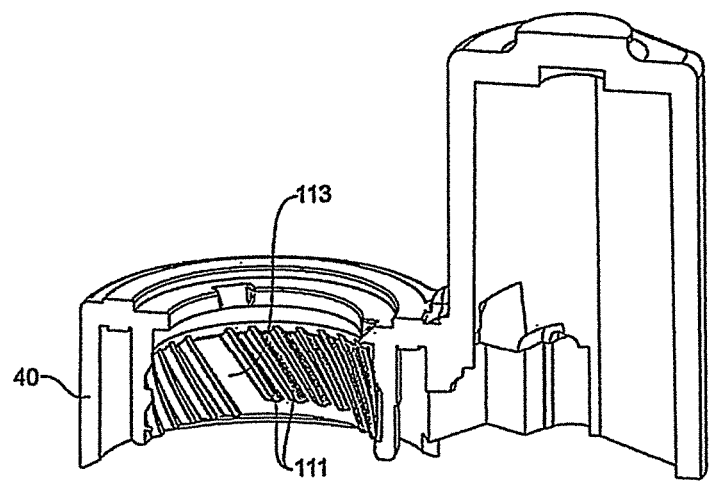
FIG. 14 is an exploded isometric view of drive stop components of the mechanism shown in FIG. 13.

A drive stop body 100b is provided as is shown in FIGS. 13 and 14 and is a second embodiment of a drive stop mean. The drive stop body 100b is movably mounted to the powerfold housing 40. This is achieved by the provision of a spline formed by spline recesses 111 within the housing 40 and spline projections 114 on the drive stop body 100b as is shown in exploded FIG. 14. The drive stop body 100b has a drive stop face 102 engagable with a drive stop detent 31 mounted to the mirror base. In fact, three drive stop faces 102 are provided on the ring shaped drive stop body 100b in this embodiment as is shown most clearly in FIG. 15. In other embodiment, not shown, one, two, four or more drive stop faces 102 may be provided.

The drive stop faces 102 are located radially inwards with respect to the clutch detent feature 24 and associated clutch recesses 95.

The mounting of the drive stop detent 31 to the mirror base can be as a separate component or by moulding or machining the drive stop detent 31 into the mirror base.

The drive stop is movably mounted to the powerfold housing 40 such that friction prevents relative movement between the drive stop body 100b and the power fold housing 40 when the drive stop face 102 pushes against the drive stop detent 31. More specifically, with this embodiment of the invention, the drive stop body 100b is mounted to the powerfold housing 40 by a spline. The spline is arranged and constructed such that friction within the spline prevents relative movement between the drive stop body 100b and the powerfold housing 40 when the drive stop face pushes against the drive stop detent 31.

Figure 16A:
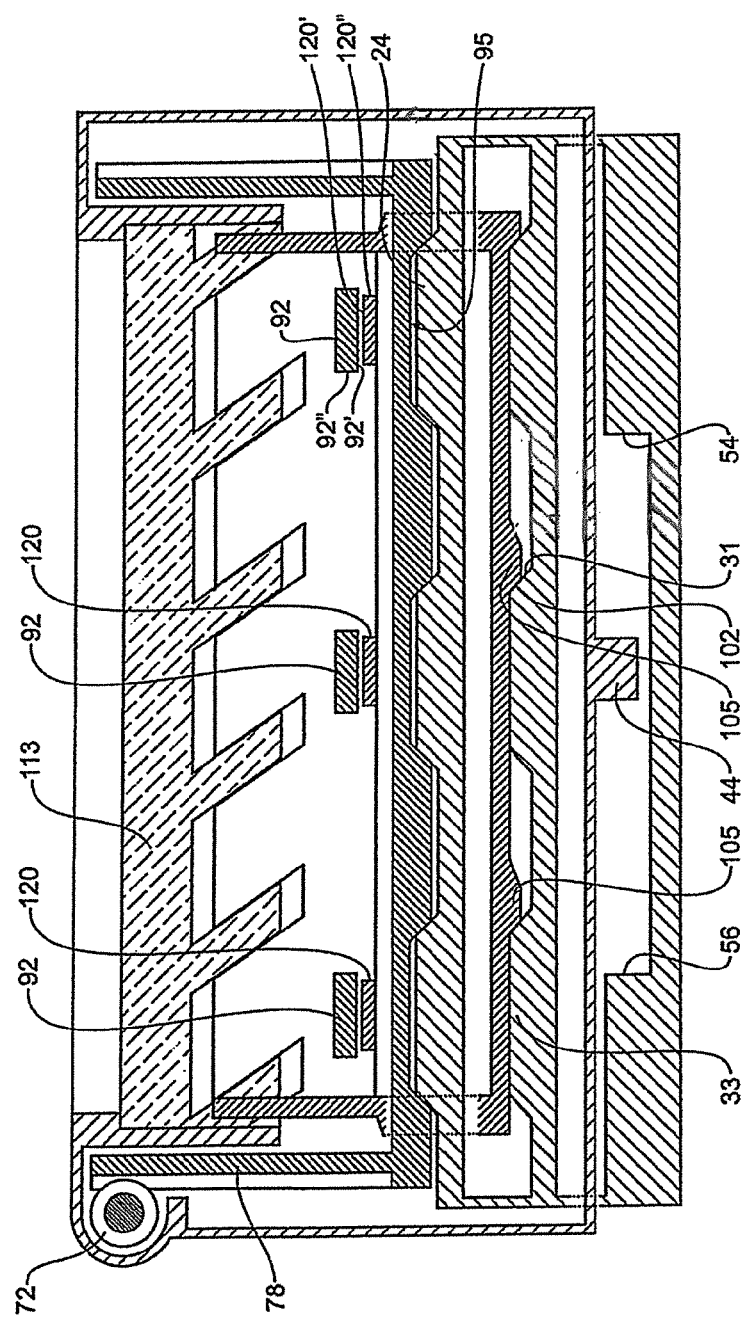
FIG. 16a is a diagrammatic view of the powerfold mechanism shown in FIGS. 13 and 14 as it interacts with the base shown in FIG. 13.

FIG. 16a shows schematically the key components of the powerfold mechanism. This Figure and subsequent FIGS. 16b to 23d are not true cross-sectional views. The areas shaded by dashed lines and designated 113 is part of the inside of a generally cylindrical splined portion of the powerfold housing as is most clearly shown in FIG. 14. It is grooved to provide spline features 111 that engage with spline features 114 of the drive stop body 100b.

The drive stop faces 102 are biased towards the drive stop detent 31 by a spring 104 as is shown in FIG. 13. In other embodiments (not shown) the compression spring 104 may be deleted and gravity may be used to bias the drive stop faces 102 towards the drive stop detent 31. The drive stop faces 102 are arcuately movable with the powerfold housing 40 between:

(a) a forward position wherein the powerfold housing 40 and mirror housing are in a forward fold position;
(b) a rearward position wherein the powerfold housing 40 and mirror head are in a rearward fold position; and
(c) a drive position wherein the powerfold housing 40 and mirror head are in a deployed position and the drive stop faces 102 are sandwiched between the detent 31 and the powerfold housing 40 so as to provide a positive and repeatable stop against which the drive train is wound up to thereby rigidly rotationally fix the powerfold housing 40 with respect to the base 20.

When the clutch member 90 is disengaged and the electric drive train creates relative rotation between the powerfold housing 40 and the clutch member 90, the powerfold housing 40 rotates relative to the base 20 until the drive stop faces 102 reaches the detent 31 and induces a reaction torque, the reaction torque being larger than the frictional engagement torque so as to stop the powerfold housing 40 rotating with respect to the base 20 and instead cause the clutch member 90 to rotate until the clutch member 90 reaches the engaged position where the drive train is wound up. If the drive train is wound up, the mirror housing 40, and hence any mirror assembly attached to the mirror housing, is rigidly rotationally fixed with respect to the base 20.

With the embodiment of the invention shown in FIG. 13, the drive train includes a worm gear and is therefore inherently non-back drivable. It is therefore lockable against back driving (for instance through manual pressure on the mirror head). In other embodiments, not shown, the drive train may not include a worm gear and alternative means may be provided to prevent back driving.

The clutch member 90 includes a lug 92 projecting radially inwards for engagement with a button mounted 120 to the drive stop 100b. The lug 92 is most clearly shown in FIG. 13. The button 120, shown in FIG. 13 and more clearly in FIG. 14, is movable radially from: an extended position in which relative axial movement between the drive stop body 100b and the clutch 90 is inhibited, to a retracted position where it is not.

The button is pushed to the retracted position during relative rotational movement between the drive stop body 100b and the clutch 90 when the button 120 and the lug 92 are at overlapping axial positions.

Operation of Powerfold Mechanism—Second Embodiment

Figure 16B:
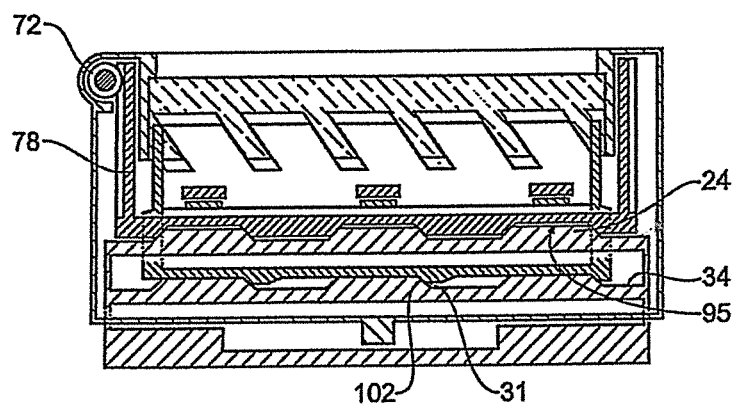
FIGS. 16b, 16c and 16d are diagrammatic views similar to that of FIG. 16a, but showing progressive movements during electric fold in of the mirror housing to the parked position.
Figure 16C:
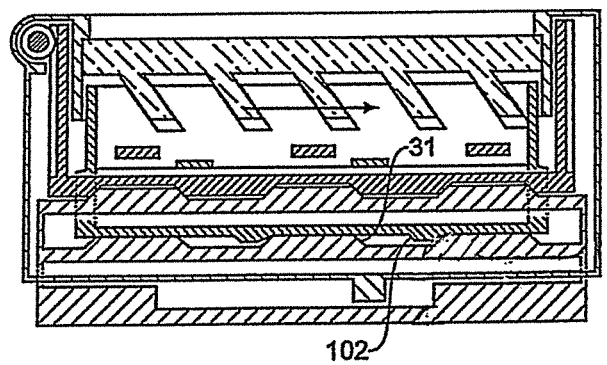
Figure 16D:
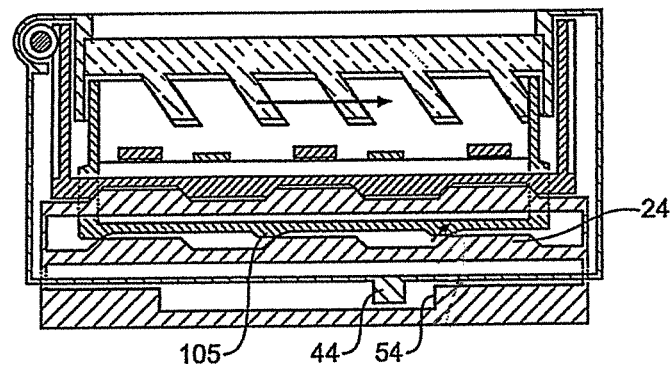
Figure 16E:
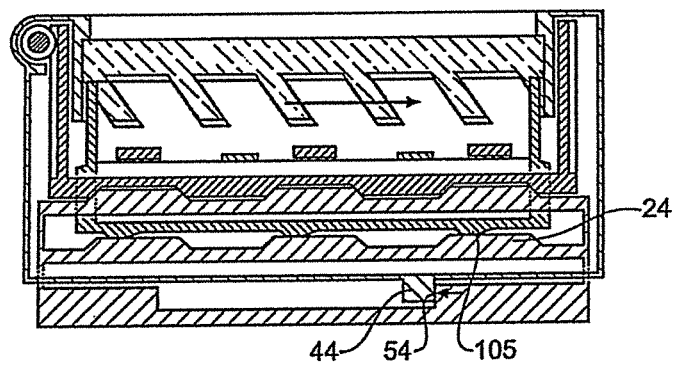

Referring now to FIGS. 16b, 16c, 16d and 16e, progressive movements during electric fold in of the mirror housing 40 (and hence mirror head) to the park position are illustrated diagrammatically. In FIG. 16b it can be seen that the clutch is engaged with the detent features 24 engaged with the clutch detent recesses 95. The drive stop face 102 is engaged against the detent 31.

The operator actuates the switch within the cabin of the vehicle to commence the electric fold in process. This sends electrical power to the motor 75 which in turn results in the main worm gear 72 driving around the drive gear 78 (which at this stage is locked to the mirror base by virtue of the clutch) and rotating the housing 40. Movement is indicated by an arrow in FIG. 16c. In moving from the position shown in FIG. 16b the position shown in FIG. 16c it can be seen that the drive stop face 102 moves away from the detent 31 slightly and then in FIG. 16d it can be seen that the drive stop projection 105 slides along the lower arc 34 (shown in FIG. 15) until an end stop on any one of the powerfold housing, the frame, or the mirror housing itself reaches the park end stop 54.

Figure 17A:
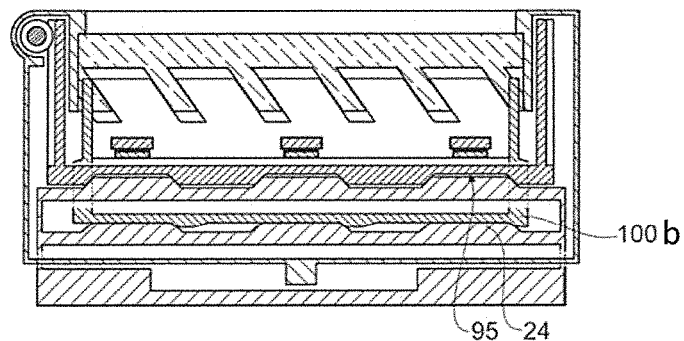
FIGS. 17a to 17e are diagrammatic views similar to that of FIGS. 16b to 16d, but showing progressive movements during manually folding the mirror head on its deployed position to its parked position along side the vehicle.
Figure 17B:
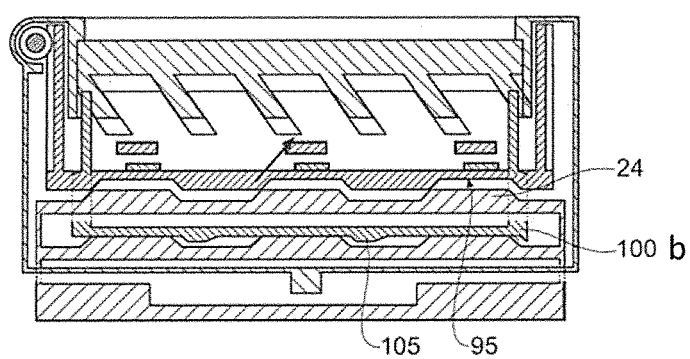
Figure 17C:
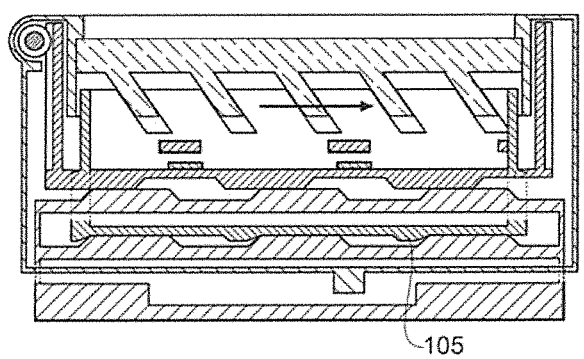
Figure 17D:
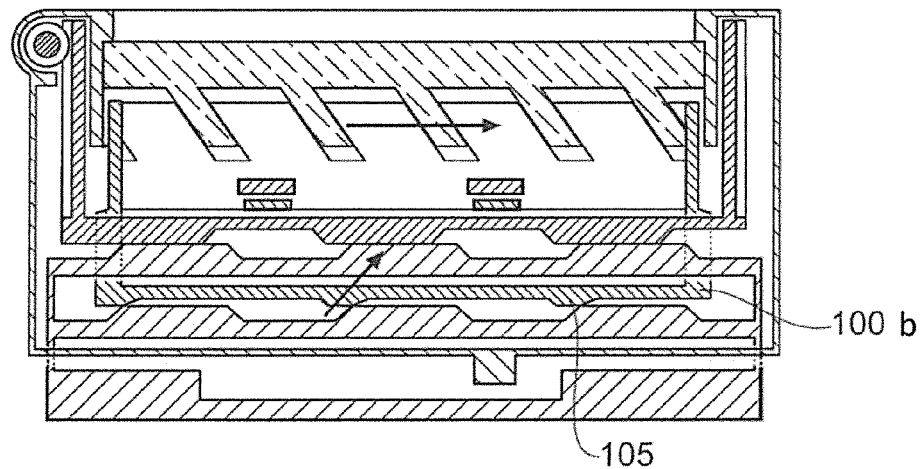
Figure 17E:
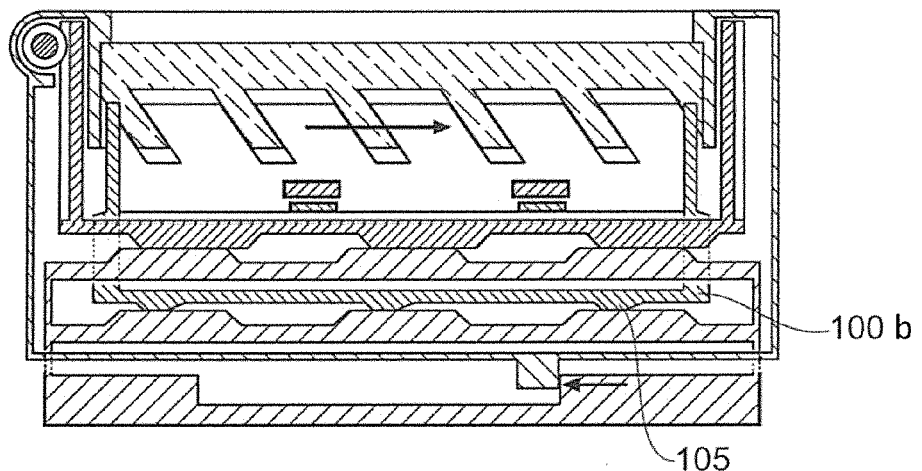

Referring now to FIGS. 17a to 17e, the process of manually folding the mirror head from its deployed position to its parked position along side the vehicle will be described. FIG. 17a shows the powerfold assembly in the drive or deployed position. As the mirror head and hence the housing 40 are rotated towards the vehicle, the non-back driveable gear train ensures that a breakaway torque is transmitted to the clutch. More specifically, ramped surfaces of the clutch detent recesses 95 slide up over the detent features 24 as is shown progressively from FIGS. 17a to 17b. As this occurs, the first spring 58 is compressed while the compression spring 104 extends to push the drive detent body 100b downwards from the position shown in FIG. 17a to the position shown in FIG. 17b so that it remains engaged with the lower arc 34 of the base 20. The stroke of the spring 104 is sufficient to keep the drive stop body 100b engaged with the drive stop projection 105 while the clutch disengages as shown in FIGS. 17c and 17d. Continuing rotation of the mirror head hence housing 40 is shown in FIGS. 17b to 17e. Once the position illustrated in FIG. 17e is reached, the housing 40 is restrained from further movement by the park end stop 54.

If the vehicle driver, or any other person, wishes to restore the mirror head to the drive position from the park position illustrated in FIG. 17e, then that person can either manually rotate the mirror head back into position shown in FIG. 17a or alternatively they can actuate a switch (generally within the cabin of the vehicle) so as to electrically drive the mirror head from the park position to the drive position. This electric recovery process is illustrated in FIGS. 18a to 18d.

Figure 18A:
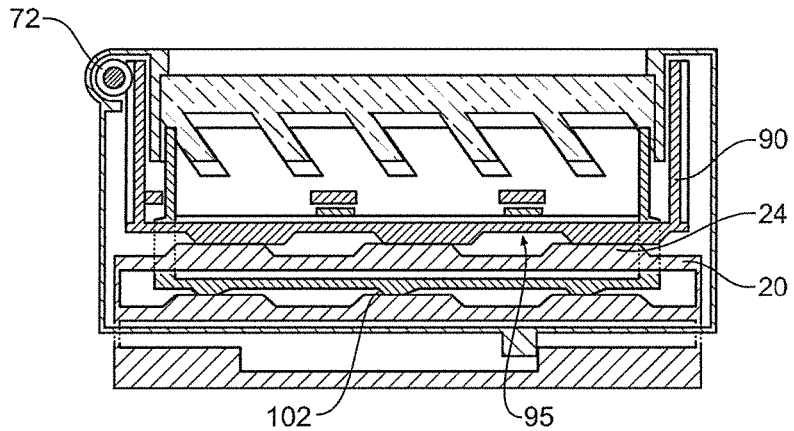
FIGS. 18a to 18h show electric recovery from the parked position to the drive position.
Figure 18B:
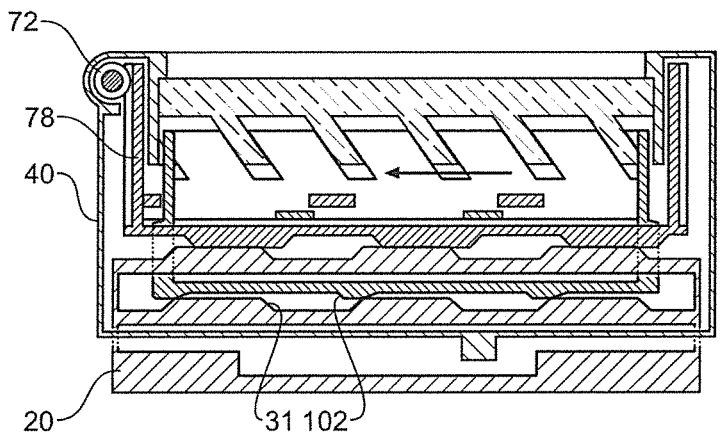
Figure 18C:
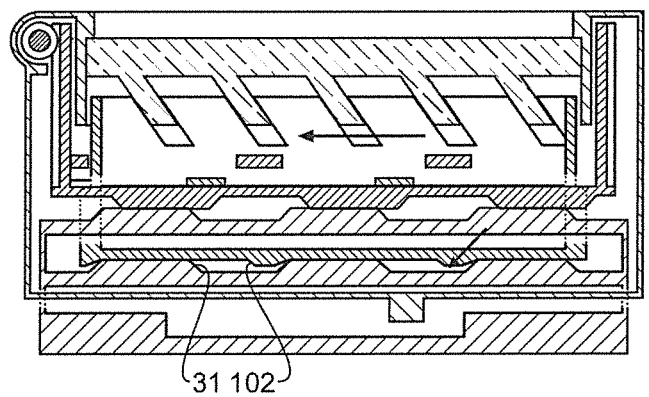
Figure 18D:
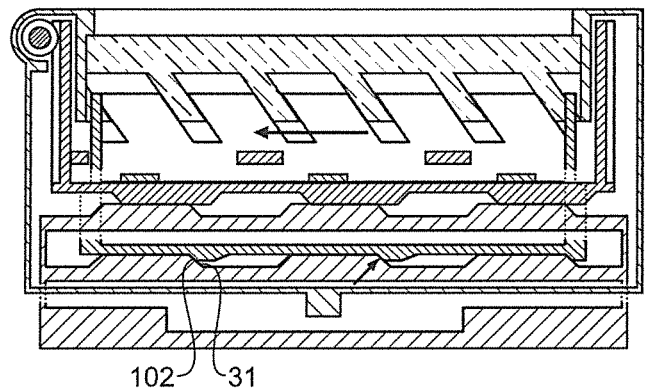
Figure 18E:
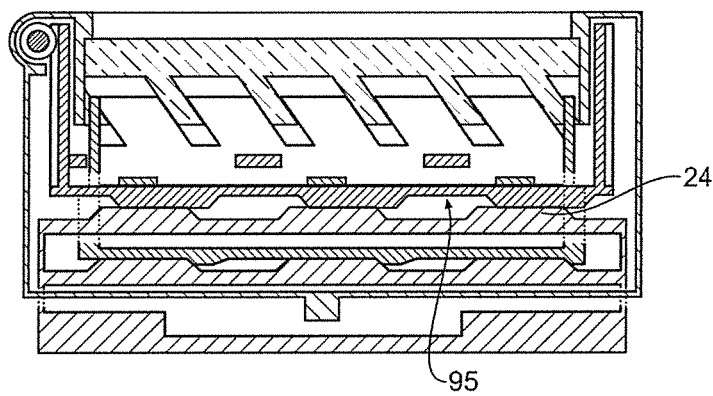
Figure 18F:
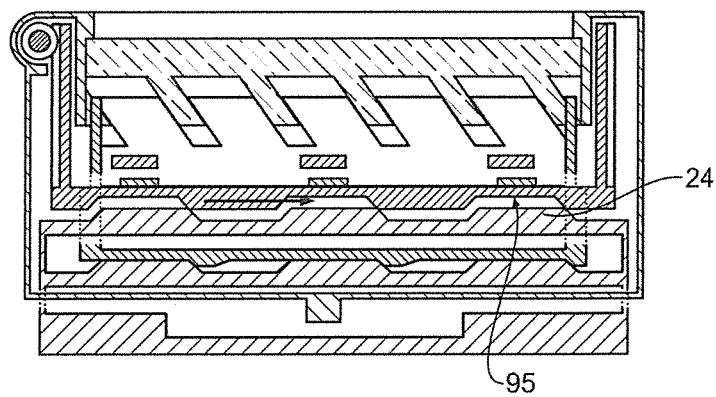
Figure 18G:
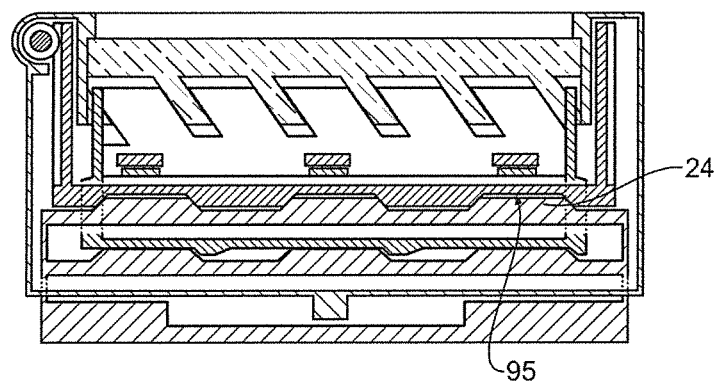
Figure 18H:
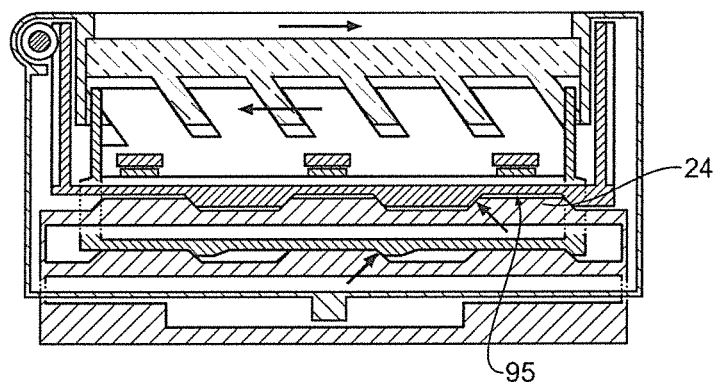

Turning to FIG. 18a, it can be seen that in this position, the clutch is disengaged with the detent features 24 out of and above the clutch detent recesses 95. There is however, some frictional engagement between the clutch member 90 and the base 20. This frictional engagement is a function of both the force imparted by the first spring 58 and the coefficient of friction and general disposition of the interface surfaces between the base 20 and the clutch member 90. So, as the electric drive train rotates the main worm gear 72, thereby creating relative rotation between the housing 40 and the clutch 90, the housing 40 rotates relative to the base 20 until the drive stop face 102 reaches the detent 31 as is illustrated progressively in FIGS. 18b to 18e. At this point, a reaction torque is induced, the reaction torque being larger than the frictional engagement torque so as to stop the housing 40 rotating with respect to the base 20 and instead cause the clutch member 100b to rotate as indicated by the arrow in FIG. 18f until the clutch member 100b reaches the engaged position illustrated in FIG. 18g. With the housing 40 moving downwards under the action of spring 58, into the position shown in FIG. 18g, the housing 40 may rotate backwards slightly resulting in some clearance between the drive stop face 102 and the detent 31 as is shown in FIG. 18g. The housing 40 then continues to rotate or at least have a torque applied to it by the drive train until the drive stop face 102 pushes hard against the base drive stop detent 31 to the drive position shown in FIG. 18h. At this point, the drive stop face 102 is sandwiched between the detent 31 and the housing 40 (by virtue of the splined connection between the drive stop body 100b and the housing 40) so as to provide a positive and repeatable stop against which the non-back driveable drive train is wound up until the motor 75 stalls. This rigidly rotationally fixes the mirror frame 20 with respect of the base 20. In addition to providing an accurate and repeatable mirror head position, the sandwiching of the drive stop face 102 provides a rigid structure for vibration performance of the mirror.

Figure 19A:
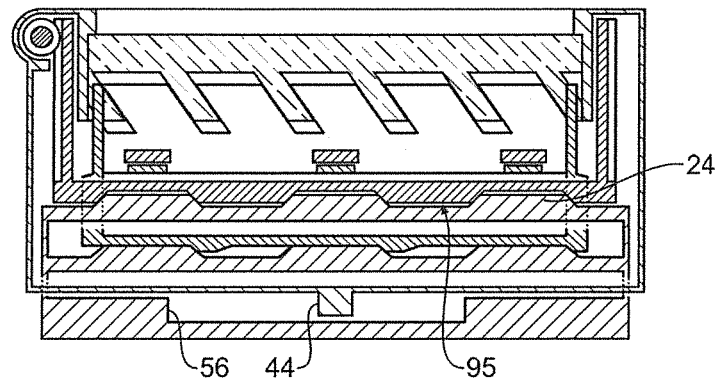
FIGS. 19a to 19e show progressive movements during manual fold forward of the mirror housing from the drive position to the forward end stop.
Figure 19B:
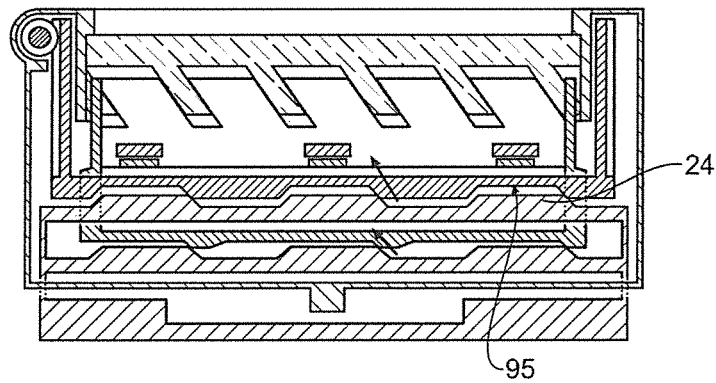
Figure 19C:
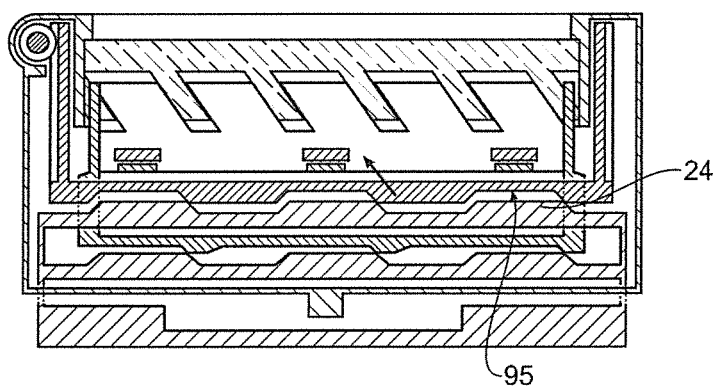
Figure 19D:
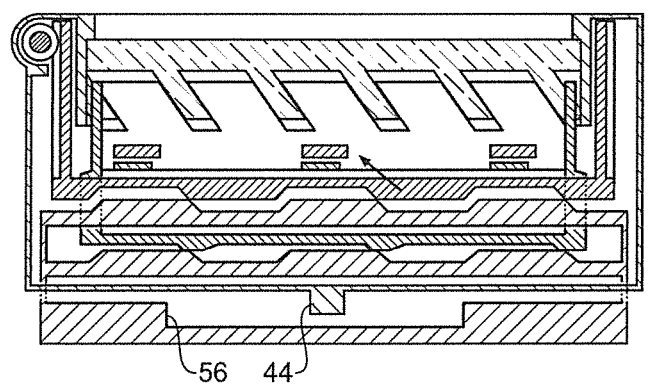
Figure 19E:
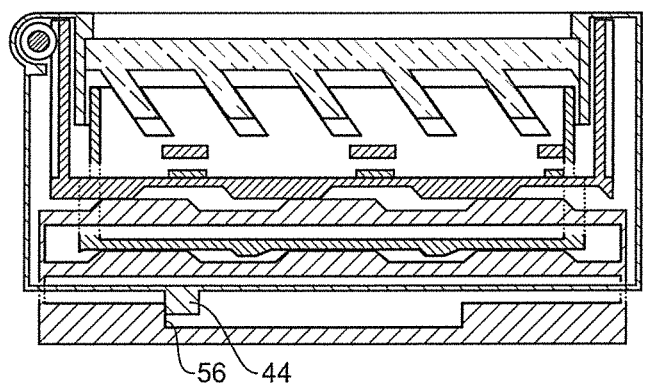

FIGS. 19a to 19e show progressive movements during manual fold forward of the mirror housing 40 from its drive position to the forward end stop 56. As the operator (or a foreign object) pushes the mirror head and hence the mirror housing 40 forwards, the non-back driveable gear train ensures that a breakaway torque is transmitted to the clutch. Specifically, ramped surfaces of the clutch detent recesses 95 slide up over the detent features 24 as is shown progressively from FIGS. 19a to 19c. As this occurs, the first spring 58 is compressed while the compression spring 104 extends slightly from the position shown in FIG. 19a to the position shown in FIG. 19b. Continuing rotation of the mirror head and hence the housing end stop 44 in a forward direction shown in FIGS. 19a to 19e. Once the position illustrated in FIG. 19e is reached, the housing end stop 44 is restrained from further movement by the frame forward end stop 56.

Figure 20A:
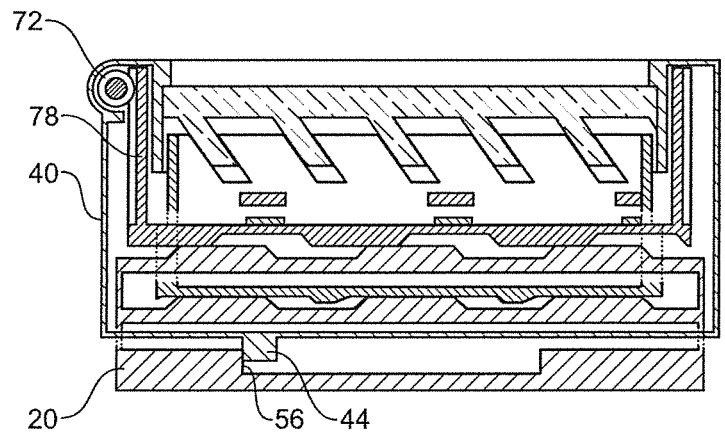
FIGS. 20a to 20i show progressive movements during electric recovery from the manual forward fold position to the drive position.
Figure 20B:
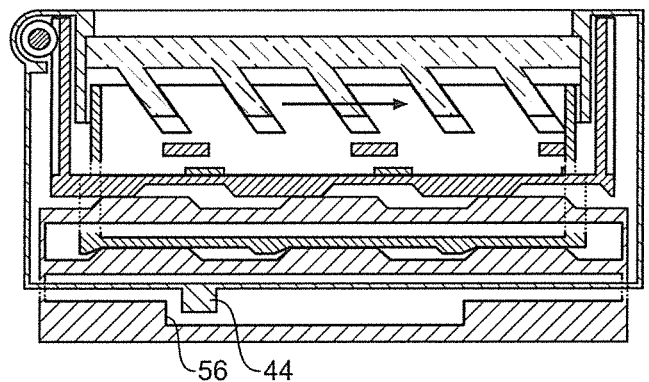
Figure 20C:
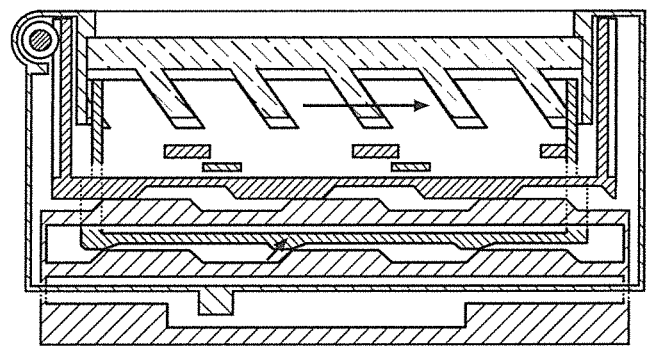
Figure 20D:
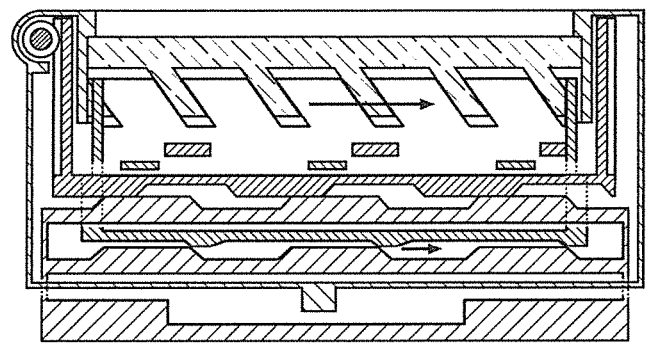
Figure 20E:
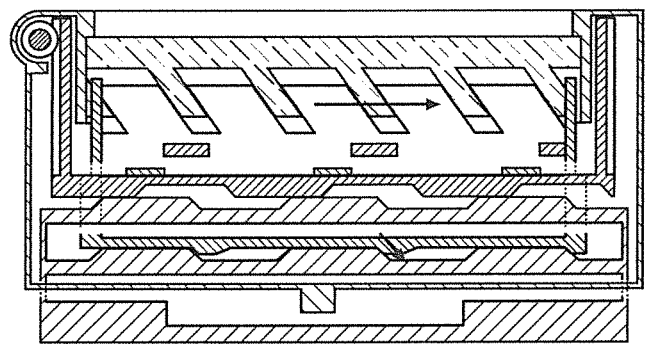
Figure 20F:
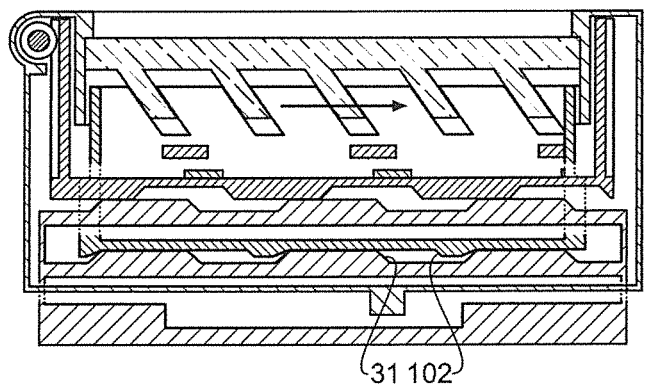
Figure 20G:
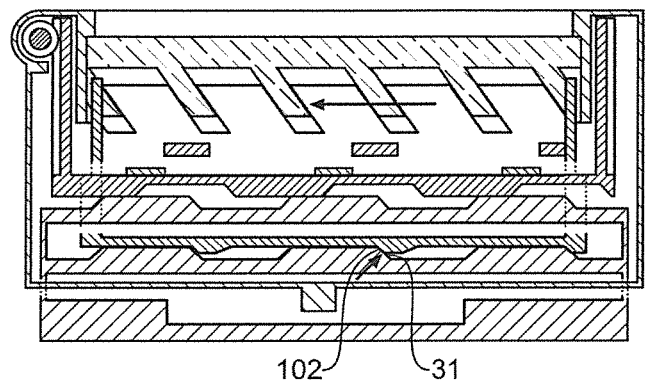
Figure 20H:
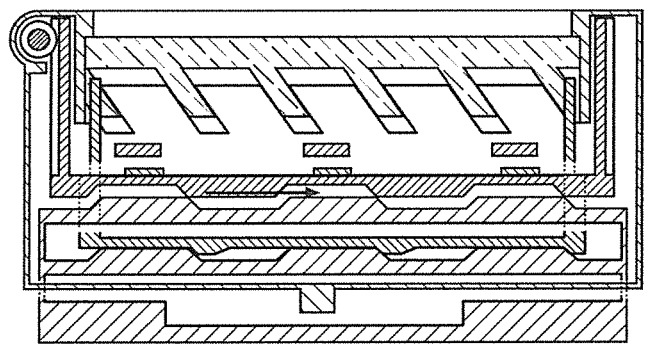
Figure 20I:
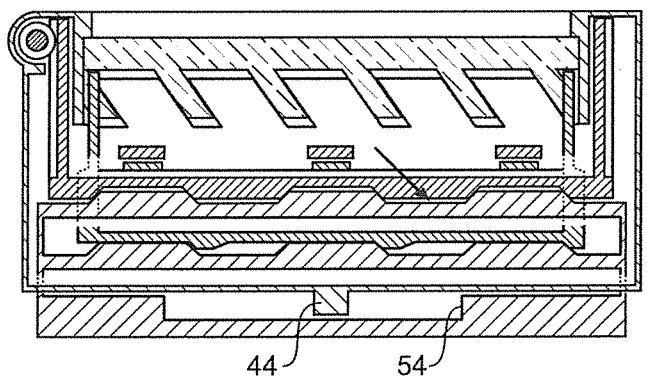

FIGS. 20a to 20i show progressive movements during electric recovery from the position shown in FIG. 20a, the manual forward fold position, to the drive position. The operator of the vehicle actuates the switch within the cabin of the vehicle to commence electric fold back of the mirror head towards the drive position. This actuation sends electrical power to the motor 75 which in turn results in the main worm gear 72 driving around the drive gear 78. As described previously, the frictional engagement between the clutch and the base is sufficient to enable relative rotation between the housing 40 and the base 20 to occur. The housing 40 continues to rotate backwards until the position illustrated in FIG. 20f is reached. At this point the operator will generally observe that the head has rotated too far and will reverse the direction by actuating a switch. The mirror head will then rotate forward to the drive position as illustrated in FIGS. 20f and 20g. More specifically, once the drive stop face 102 reaches the detent 31 as is shown in FIG. 20g a reaction torque will be generated that is larger than the frictional engagement torque which will stop the frame rotating with respect to the base and will cause the clutch member 90 to rotate until it reaches the engaged position shown in FIG. 20i. At that point, the drive train drives the drive stop face 102 against the detent 31 where the drive train is wound up.

Figure 21A:
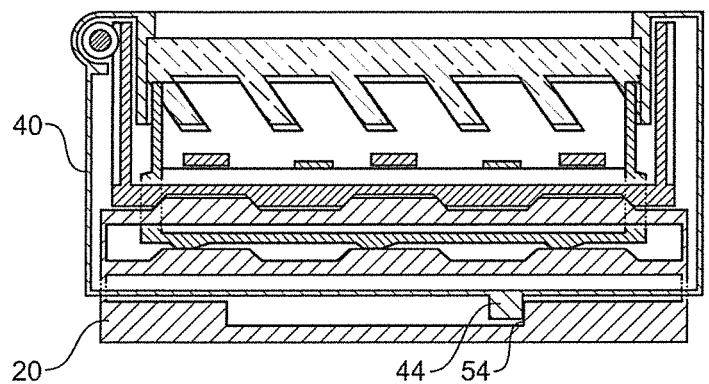
FIGS. 21a to 21d show progressive movements during electric fold out from the park position to the drive or deployed position.
Figure 21B:
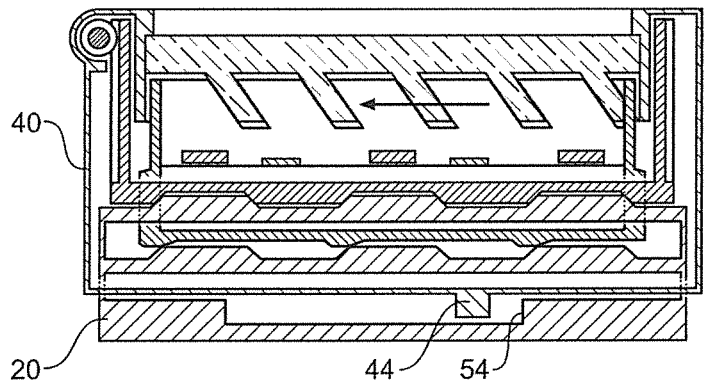
Figure 21C:
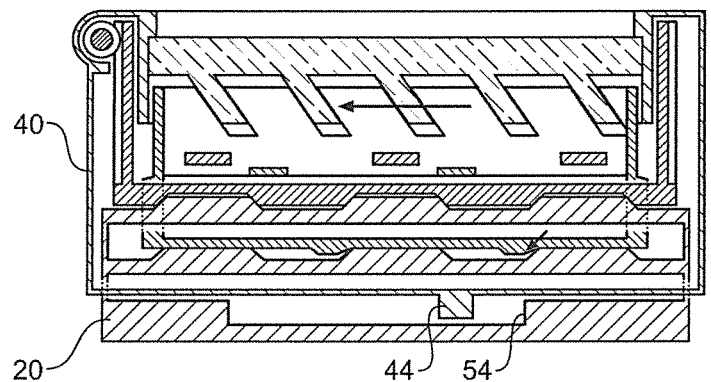
Figure 21D:
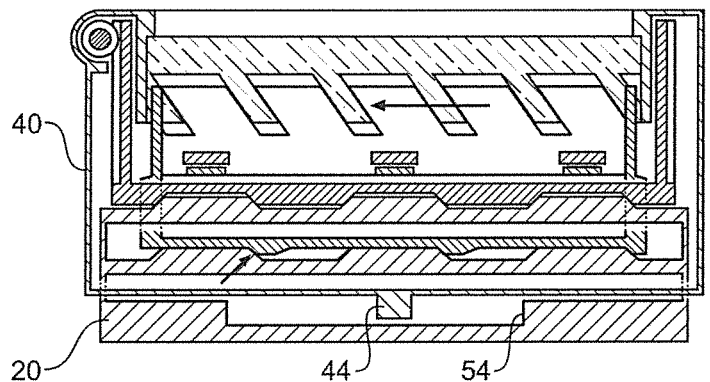

FIGS. 21a to 21d show progressive movements during electric fold out from the parked position to the drive (or deployed) position. FIG. 21a shows the powerfold mechanism in its parked position with the housing end stop 44 against park end stop 54 after an electric fold to that position. The operator of the vehicle actuates a switch within the cabin of the vehicle to commence electric fold out on the parked position shown in FIG. 21a towards to the drive position. This actuation sends electrical power to the motor 75 which in turn results in the main worm gear 72 driving around the drive gear 78 as has been previously described. The drive stop body 100 rotates with the housing as is shown progressively in FIGS. 21b through to 21d.

Referring to FIG. 13, it can be seen that the clutch member 90 has a lug 92 on its inside periphery. In fact, three lugs 92 are provided. These lugs 92 are engagable with three corresponding buttons 120 shown in an exploded view adjacent the drive stop body 100. The buttons 120 are shown more clearly in FIG. 14. They are resiliently arranged such that they can be depressed and moved radially inwards as will be explained below. In the embodiment shown in FIG. 14, a button landing 122 is provided to limit axial movement of the button 120.

Figure 22A:
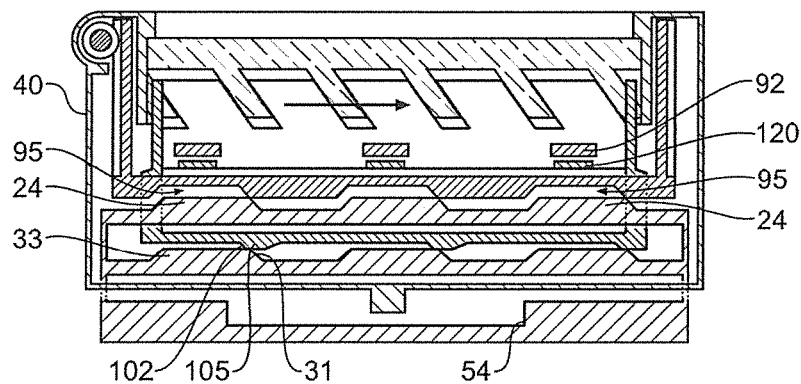
FIGS. 22a to 22c show progressive movements of the powerfold mechanism during manual return of the mirror head from a forward fold position.
Figure 22B:
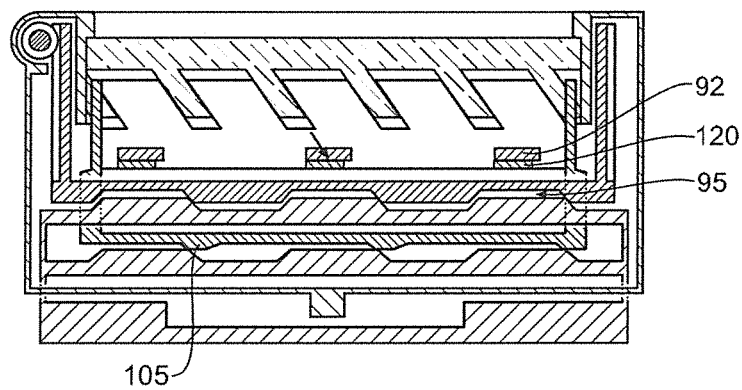
Figure 22C:
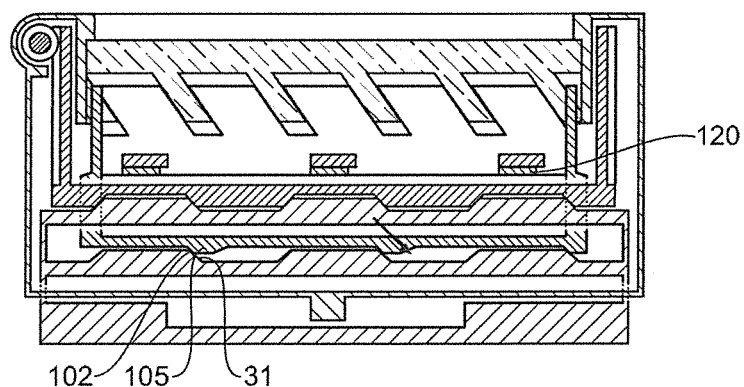

Referring now to FIGS. 22a to 22c, the function of the button 120 and lug 92 will be explained.

FIG. 22a shows the powerfold mechanism during manual return of the mirror head from a forward fold position. More specifically, FIG. 22a shows the powerfold mechanism returned almost to the drive position with the clutch detent recess 95 just about to land on the detent feature 24. In this position, the drive stop body 100 can still be a forward position due the elasticity of the housing being released during manual folding. As a consequence of this, the drive stop projection 105 can still be resting on the drive stop projection landing 33 as is shown in FIG. 22a. Should this occur, the lug 92 on the clutch member 90 will push against an upper surface 120' of the button 120 as is indicated by an arrow on FIG. 22b when the clutch resets and the clutch detent recess 95 and detent feature 24 moved to the position shown in FIG. 22c. The pushing of the button 120 by the lug 92 ensures that the drive stop projection 105 drops into position shown in FIG. 22c where the drive stop face 102 is engaged with the drive stop detent 31.

This functionality provided by the button 120 and the lug 92 is important because if the drive stop face 102 did not engage the detent 31, then the mirror head will be loose.

Now referring to FIGS. 23a to 23d, a further function of the button 120 and lug 92 will be explained. FIGS. 23a to 23d show electric recovery from a forward fold position, when the clutch member 90 is engaged with the detents on the base 20.

Figure 23A:
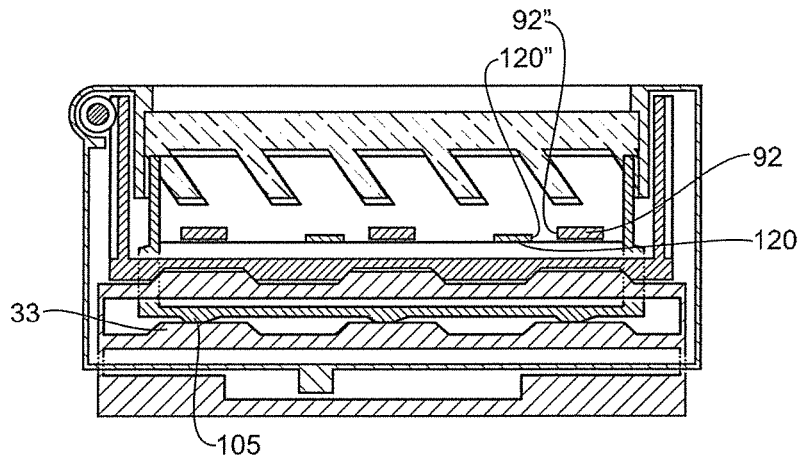
FIGS. 23a to 23d show progressive movements of the powerfold mechanism during electric recovery from a forward fold position when the clutch member is engaged from the detents on the base.
Figure 23B:
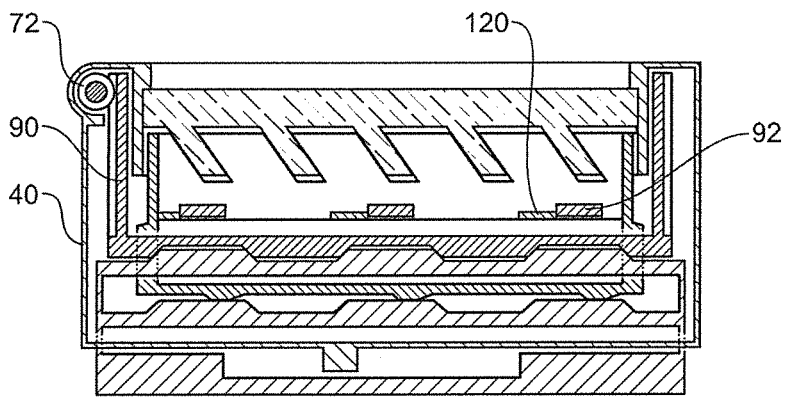
Figure 23C:
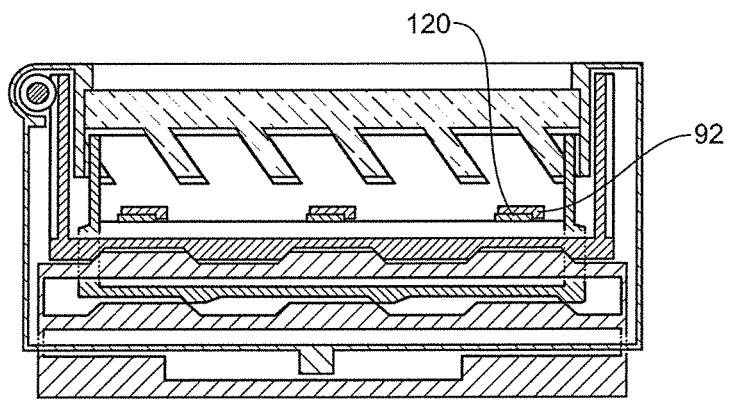
Figure 23D:
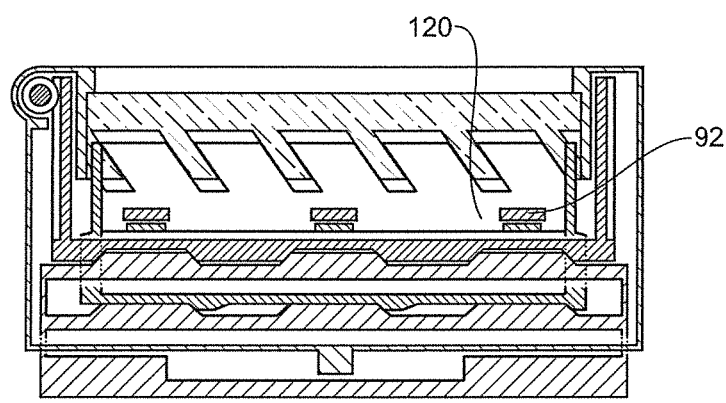

FIG. 23a shows a possible start position where the manual fold detents are engaged but the drive stop projection 105 is raised and is sitting on the drive stop projection landing 33. As the mirror housing 40 is rotated by the worm gear 72 driving around the clutch member 90, the button 120 moves from the position shown in FIG. 23a to the position shown in FIG. 23b such that its end face 120" engages a corresponding end face 92" on the lug 92. Once engaged as shown in FIG. 23b, further movement towards the position shown in FIG. 23c results in the lug 120 being pressed radially inwards thereby allowing the drive stop body 100b to continue to rotation to the position shown in FIG. 23d.

Third Embodiment

Figure 24:
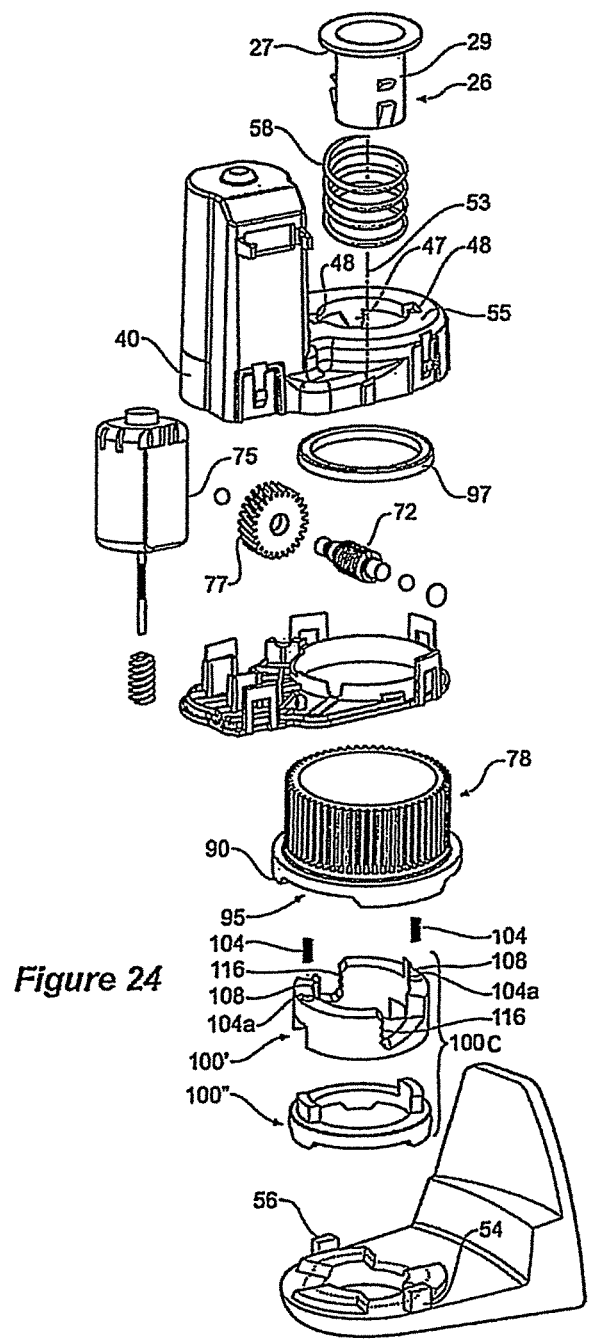
FIG. 24 is an exploded isometric view of a powerfold mechanism according a third embodiment of the invention.
Figure 25:
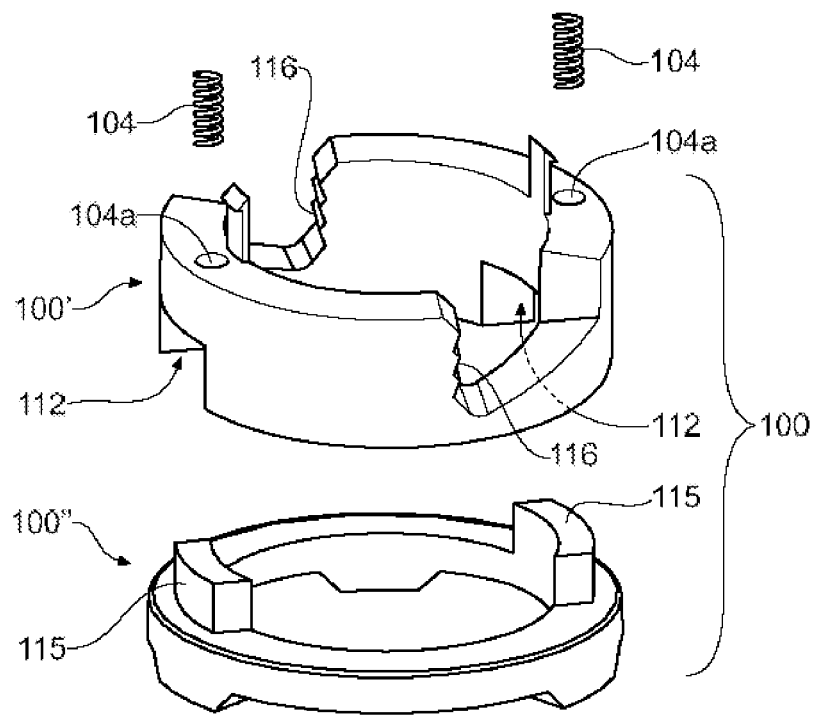
FIG. 25 is an exploded isometric view of drive stop components of the mechanism shown in FIG. 24.
Figure 26:
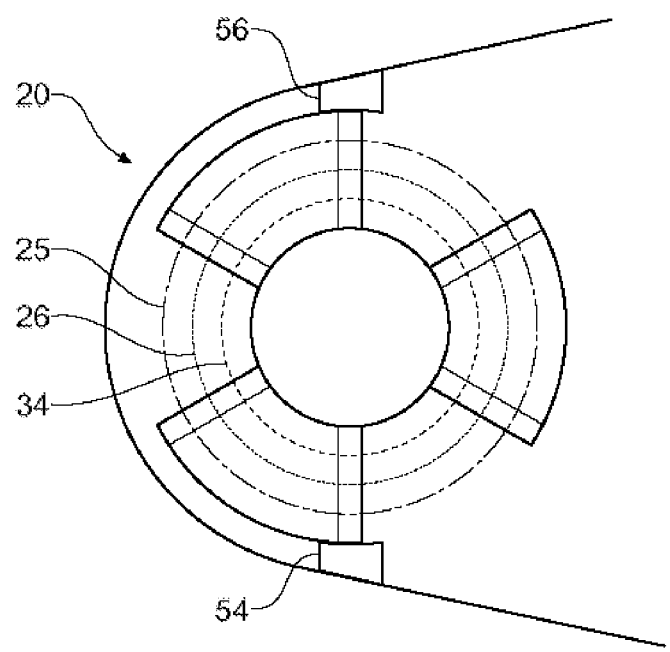
FIG. 26 is a plan view of a portion of the base showing the detent circle and the drive stop circle.
Figure 27A:
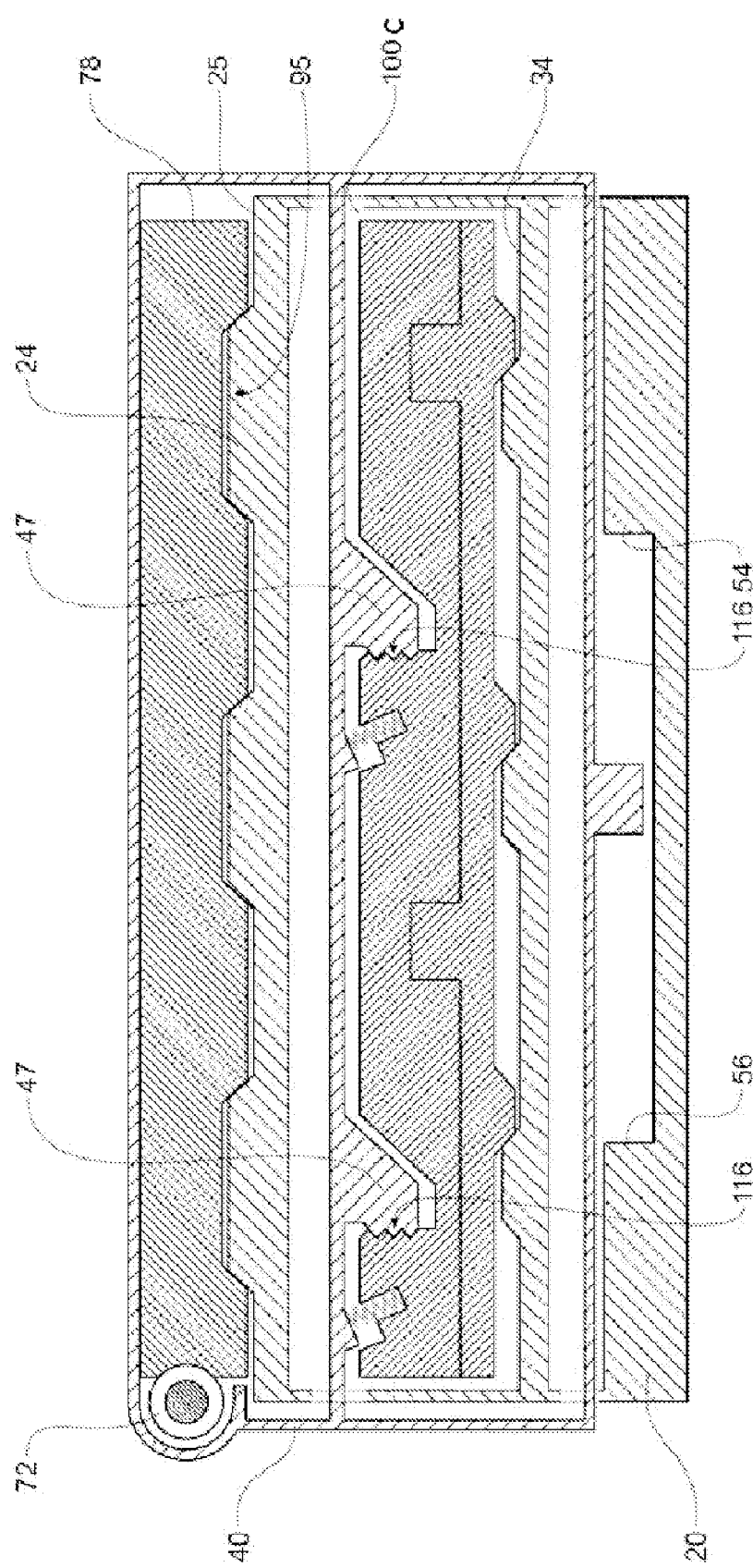
FIG. 27a is a diagrammatic view of the powerfold mechanism shown in FIG. 24 as it interacts with the base.

Referring to FIGS. 24, 25 and 26, a third embodiment of the invention is shown. This embodiment of the invention is similar to that of the second embodiment of the invention as shown particularly in FIGS. 13, 14 and 15. However, the drive stop body 100b and its interface with the powerfold housing 40 are different. With the third embodiment of the invention, the two-part drive stop body 100c is movably mounted to the powerfold housing 40 by the provision of a spline as shown in exploded FIG. 14. In contrast, with the second embodiment of the invention, the drive stop body 100c is clipped by clips 108 to the powerfold housing 40, the clips 108 being received by clip receiving recesses 48 as shown in FIG. 24. Compression springs 104 sit between the powerfold housing 40 and upper surfaces of the drive stop body 100. Recesses 104a are provided to stabilise and hold the springs 104. Ratchet features 116 engage with corresponding features on housing legs 47. This ratchet arrangement allows the two part drive stop body 100c to adopt three positions relative to the housing 40. This embodiment of the invention is shown schematically in FIG. 27a.

Referring again to FIGS. 24 and 25, it can be seen that the two-part drive stop 100c shown is made from two components, a drive stop body upper 100' and a drive stop body lower 100". The drive stop body lower 100" has a pair of diametrically opposed tongues 115 that engage corresponding oldham grooves 112 in the drive stop body upper 100'. This allows the drive stop body to function as an oldham coupling. The oldham coupling allows for misalignment along the mirror head axis 53 due to manufacturing tolerances. In further embodiments of the invention, not shown, the oldham coupling may be dispensed with (the drive stop body upper 100' and a drive stop body lower 100" may be a single component). Alternatively, the oldham coupling may be used with other embodiments of the invention such as the second embodiment of the invention.

Operation of Powerfold Mechanism—Third Embodiment

Referring now to FIGS. 27b, 27c, 27d, 27e and 27f, progressive movements showing electric recovery after a manual folding. This electric recovery process is similar to that described with reference to the second embodiment of the invention and illustrated in FIGS. 18a to 18d.

Figure 27B:
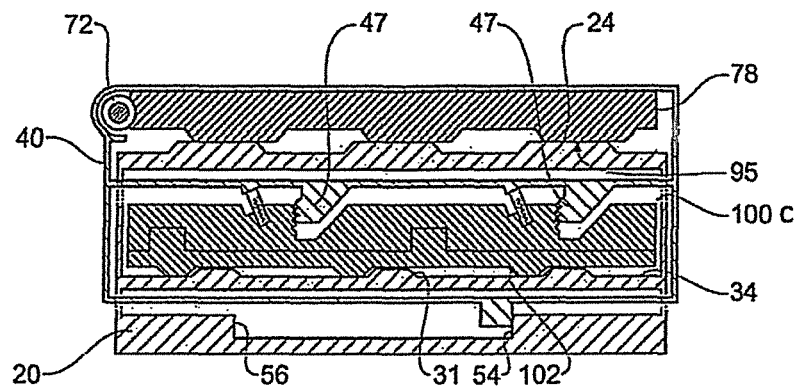
FIGS. 27b, 27c, 27d, 27e and 27f are diagrammatic views similar to that of FIG. 27a, but showing progressive movements during electric recovery after a manual folding.
Figure 27C:
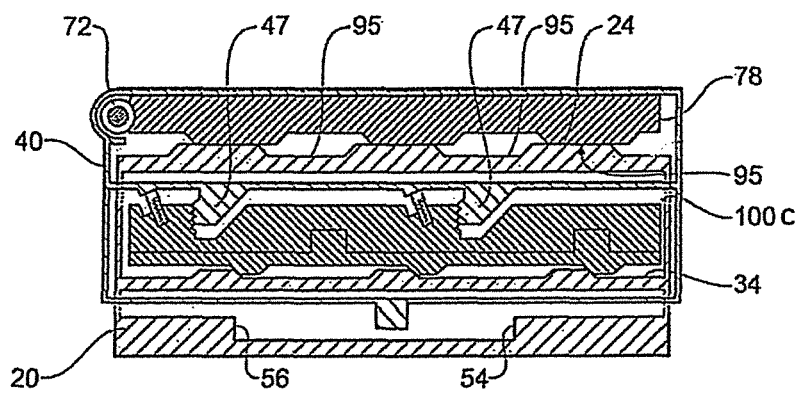
Figure 27D:
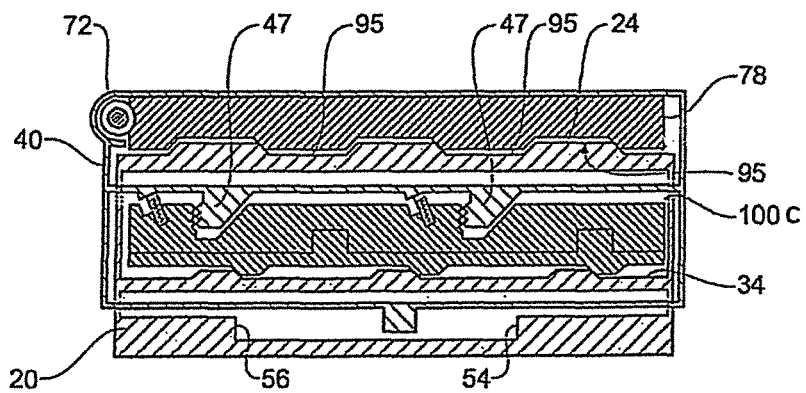
Figure 27E:
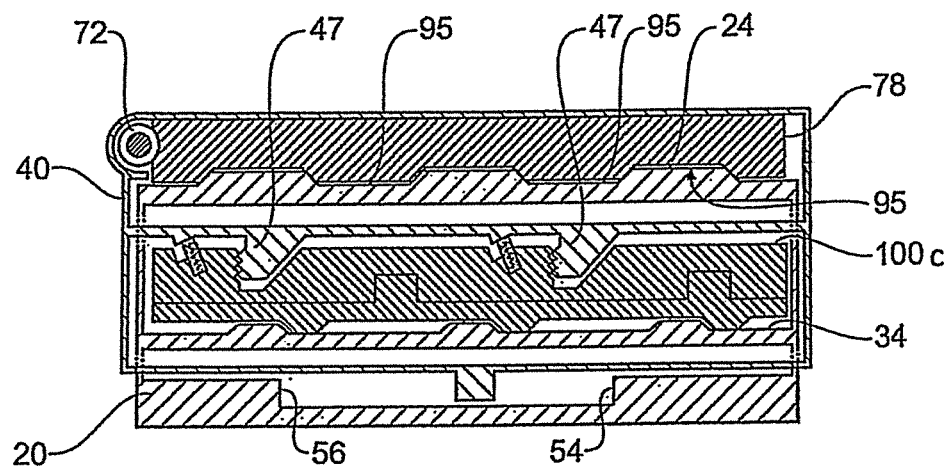
Figure 27F:
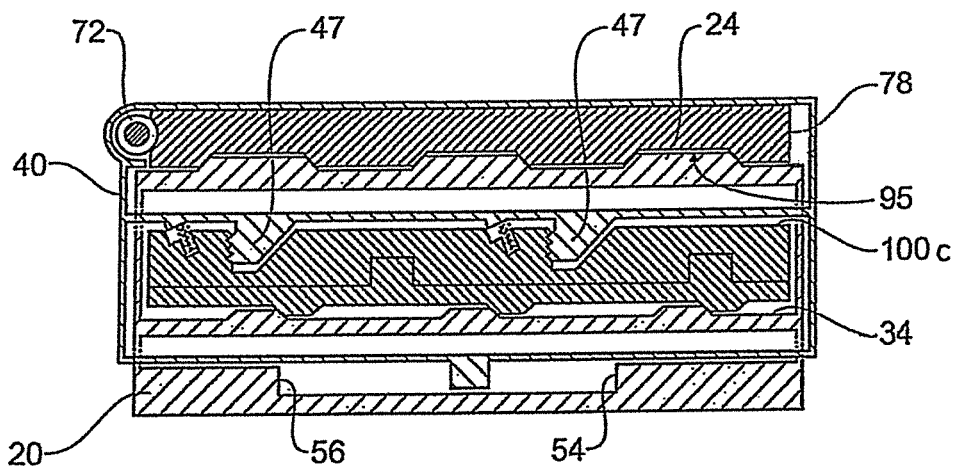

FIG. 27b shows the clutch disengaged with the clutch detent features 24 out of the clutch detent recesses 95. There is however, some frictional engagement between the clutch member 90 and the base 20. This frictional engagement is a function of both the force imparted by the spring 58 and the coefficient of friction and general disposition of the interface services between the base 20 and the clutch member 90. So as the electric drive train rotates the main worm gear 72, thereby creating relative rotation between the housing 40 and the clutch 90, the housing 40 rotates relative to the base until the drive stop face 102 reaches the drive stop detent 31. At this point, a reaction torque is induced, the reaction torque being larger than the frictional engagement torque so as to stop the housing 40 rotating with respect to the base 20 and instead cause the clutch member 100 to rotate until the clutch member 100 reaches the engaged position illustrated in FIG. 27c. With the housing 40 moving downwards under the action of spring 58 into position shown in FIG. 27d, the housing 40 rotates backwards slightly resulting in some clearance between the drive stop face 102 and the detent 31 as is shown in FIG. 27e. The housing 40 then continues to rotate, or at least have a torque applied to it by the drive train, until the drive stop face 102 pushes hard against the detent 31 as is shown in FIG. 27f. At this point, the drive stop face 102 is sandwiched between the drive stop detent (ramp) 31 and the housing 40 since the ratchet is engaged. This provides a positive and repeatable stop against which the non-back-drivable drive train is wound up until the motor 75 stalls.

While the present invention has been described in terms of preferred embodiments in order to facilitate better understanding of the invention, it should be appreciated that various modifications can be made without departing from the principles of the invention. Therefore, the invention should be understood to include all such modifications in its scope.

LEGEND 20 mirror base
22 bayonet aperture
24 clutch detent feature
26 bayonet end
27 flange
29 spigot
31 detent
33 upper arc
34 lower arc
40 power fold housing
44 housing end stop
46 pin housing
47 housing leg
48 clips receiving recess
49 bore
50 frame
51 mirror head
53 head axis
54 park end stop
55 spring seat
56 forward end stop
58 first spring
72 main worm gear
75 motor
76 motor worm
78 drive gear
90 clutch member
92 lug
95 clutch detent recess
97 thrust bearing
100 pin
100b drive stop body
100c two part drive stop body
100' drive stop body upper
100" drive stop body lower
101 end
102 drive stop face
103 pin
104 compression spring
104a Recess for spring
105 stop projection
108 clips
111 spline recess
112 oldham groove
113 dashed lines and designated
114 spline features
116 ratched feature
120 button
122 button landing
77 gear

The invention claimed is:

1. A powerfold mechanism for an external rear view mirror to be fitted to a motor vehicle, the mechanism comprising:
   a powerfold housing mountable between a mirror housing and a vehicle mountable mirror base;
   a clutch member urged into engagement with the mirror base by a first spring means, the clutch member axially movable from an engaged position in which clutch detent features positively restrain relative rotation between the clutch member and the mirror base and a disengaged position in which a frictional engagement torque only somewhat restrains relative rotation between the clutch member and the mirror base about an axis of a mirror head, the clutch member allowing the mirror housing to be manually moved with respect to the mirror base;

an electric drive train for creating relative rotation between the power fold housing and the clutch member about the mirror head axis, said electric drive train is non-back drivable; wherein, when the clutch member is in the disengaged position and the electric drive train creates relative rotation between the power fold housing and the clutch member, the power fold housing rotates relative to the base until a drive stop face of a drive stop mean reaches a drive stop detent and induces a reaction torque, the reaction torque being larger than the frictional engagement torque so as to stop the power fold housing rotating with respect to the base and instead cause the clutch member to rotate until the clutch member reaches the engaged position, wherein the drive stop mean being movably mounted to the power fold housing and having the drive stop face engagable with the detent mounted to the mirror base, the drive stop face biased axially towards the detent, the drive stop face accurately movable with the powerfold housing between:

(a) a forward position wherein the powerfold housing and mirror head are in a forward fold position;

(b) a rearward position wherein the powerfold housing and mirror head are in a rearward fold position; and (c) a drive position wherein the powerfold housing and mirror head are in a deployed position, the clutch member is in the engaged position and the drive stop face is sandwiched between the detent and the powerfold housing so as to provide a positive and repeatable stop.

2. A powerfold mechanism as claimed in claim 1 wherein the drive train includes a main worm gear.

3. A powerfold mechanism as claimed in claim 2 wherein the main worm gear meshes with a clutch gear, the clutch gear operably connected to or integral with the clutch member.

4. A powerfold mechanism as claimed in claim 1 wherein, when the drive stop face reaches the detent while driven by the electric drive train, after the clutch member reaches the engaged position, the drive train is wound up rigidly rotationally fixing the powerfold housing with respect to the base against vibration loads.

5. A powerfold mechanism as claimed in claim 1 wherein the drive stop mean includes a ring shaped drive stop body, the drive stop body axially movable with respect to the powerfold housing.

6. A powerfold mechanism as claimed in claim 5 including three drive stop faces and three corresponding detents.

7. A powerfold mechanism as claimed in claim 1 wherein the drive stop face is located radially inwards with respect to the clutch detents.

8. A powerfold mechanism as claimed in claim 1 includes a compression spring, the compression spring biasing the drive stop mean to move axially towards the drive stop detent.

9. A powerfold mechanism as claimed in claim 1 wherein the drive stop mean is movably mounted to the powerfold housing such that friction prevents relative movement between the drive stop mean and the powerfold housing when the drive stop face pushes against the detent.

10. A powerfold mechanism as claimed in claim 9 wherein the drive stop mean is mounted to the power fold housing by a spline.

11. A powerfold mechanism as claimed in claim 10 wherein the spline is arranged and constructed such that friction within the spline prevents relative movement between the drive stop mean and the power fold housing when the drive stop face pushes against the detent.

12. A powerfold mechanism as claimed in claim 1 wherein the clutch member includes a lug projecting radially inwards for engagement with a button mounted to the drive stop mean.

13. A powerfold mechanism as claimed in claim 12 wherein the button is movable radially from an extended position in which relative axial movement between the drive stop mean and the clutch is inhibited, to a retracted position where relative axial movement between the drive stop mean and the clutch is not inhibited.

14. A powerfold mechanism as claimed in claim 13 wherein the button is pushed to the retracted position during relative rotational movement between the stop mean and the clutch when the button and the lug are at overlapping axial positions.

15. A powerfold mechanism as claimed in claim 1 wherein the drive stop mean comprise a slidably mounted pin mounted to the powerfold housing and having a pin end extendable along the mirror head axis, the pin end biased towards the detent.

16. A powerfold mechanism as claimed in claim 15 wherein the drive train includes a main worm gear, the main worm gear meshing with a clutch gear, the clutch gear operably connected to or integral with the clutch member.

17. A powerfold mechanism as claimed in claim 16 wherein the pin is located adjacent to and outboard of the clutch gear but in a position substantially opposite the main worm gear.

* * * * *